(12) United States Patent
Walker

(10) Patent No.: US 6,744,922 B1
(45) Date of Patent: Jun. 1, 2004

(54) SIGNAL PROCESSING METHOD AND VIDEO/VOICE PROCESSING DEVICE

(75) Inventor: Toby Walker, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/647,303

(22) PCT Filed: Jan. 27, 2000

(86) PCT No.: PCT/JP00/00422

§ 371 (c)(1),
(2), (4) Date: Sep. 27, 2000

(87) PCT Pub. No.: WO00/45603

PCT Pub. Date: Aug. 3, 2000

(30) Foreign Application Priority Data

Jan. 29, 1999 (JP) .......................................... 11-023069

(51) Int. Cl.$^7$ ................................................. G06K 9/46
(52) U.S. Cl. ........................ 382/190; 382/173; 382/305
(58) Field of Search ................................ 382/173, 178, 382/190, 232, 260, 305, 181, 195, 209, 236; 358/403; 345/700; 348/157

(56) References Cited

U.S. PATENT DOCUMENTS

| | | | | |
|---|---|---|---|---|
| 5,664,227 A | * | 9/1997 | Mauldin et al. ............. | 715/516 |
| 5,751,377 A | | 5/1998 | Kadono ....................... | 348/586 |
| 5,821,945 A | * | 10/1998 | Yeo et al. .................... | 345/440 |
| 6,278,446 B1 | * | 8/2001 | Liou et al. ................... | 345/700 |

FOREIGN PATENT DOCUMENTS

| | | |
|---|---|---|
| EP | 0 711 078 | 5/1996 |
| JP | 2-59976 | 2/1990 |
| JP | 7-193748 | 7/1995 |
| JP | 8-181995 | 7/1996 |
| JP | 10-257436 | 9/1998 |

OTHER PUBLICATIONS

Yeung, et al. "Extracting story units from long programs for video browing and navigation", IEEE, pp. 296–305, 1996.*
Taskiran, et al. "A compressed video database structured for active browsing and search", IEEE, pp. 133–137, 1998.*
Yeung, et al. "Time–constrained clustering for segmentation of video into story units", IEEE, pp. 375–380, 1996.*
Yoshitaka, et al. "Content–based retrieval of video data by the grammar of film", IEEE, pp. 310–317, 1997.*
Rui, et al. "Exploring video structure beyond the shots", IEEE, pp. 1–4, 1998.*
Aoki, et al. "A shot classification method of selecting effective key–frames for video browsing", ACM, pp. 1–10, 1996.*
Merlino, et al. "Broadcast news navigation using story segmentation", ACM, pp. 381–391, 1997.*
Vasconcelos, et al. Bayesian modeling of video editing and structure: semantic features for video summarization and browsing IEEE, pp. 153–157, 1998.*
Nakamura, et al. "Semantic analysis for video contents extraction–spotting by association in news video", ACM, pp. 393–401, 1997.*
Maybury, et al. "Multimedia summaries of broadcast news", IEEE, pp. 442–449, 1997.*
Yeung, et al. "Video visualization for compact presentation and fast browsing of pictorial content", IEEE, pp. 771–785, 1997.*

* cited by examiner

*Primary Examiner*—Daniel Mariam
(74) *Attorney, Agent, or Firm*—Frommer Lawrence & Haug LLP; William S. Frommer; Bruno Polito

(57) ABSTRACT

The video signal processor 10 includes a chain detector 16 which uses features extracted from visual and/or audio segments divided from an input stream of video data, and a criterion for determination of similarity between visual and/or audio segment pairs, calculated for each of the features using the similarity determination criterion, to detect similarity chains each composed of a plurality of visual and/or audio segments similar to each other from the visual and/or audio segments, and a chain analyzer 18 which analyzes the similarity chains to determine and output local and/or global video structures of the video data.

37 Claims, 15 Drawing Sheets

SIGNAL PROCESSING METHOD AND VIDEO/VOICE PROCESSING DEVICE

TECHNICAL FIELD

The present invention relates to a signal processing method for detecting and analyzing a pattern reflecting a semantics on which a signal is based, and a video signal processor for detecting and analyzing a visual and/or audio pattern reflecting a semantics on which a video signal is based.

BACKGROUND ART

It is often desired to search, for playback, a desired part of a video application composed of a large amount of different video data, such as a television program recorded in a video recorder, for example.

As a typical one of the image extraction techniques to extract a desired visual content, there has been proposed a story board which is a panel formed from a sequence of images defining a main scene in a video application. Namely, a story board is prepared by decomposing a video data into so-called shots and displaying representative images of the respective shots. Most of the image extraction techniques are to automatically detect and extract shots from a video data as disclosed in "G. Ahanger and T. D. C. Little: A Survey of Technologies for Parsing and Indexing Digital Video, Journal of Visual Communication and Image Representation 7: 28–4, 1996", for example.

It should be noted that a typical half-hour TV program for example contains hundreds of shots. Therefore, with the above conventional image extraction technique of G. Ahanger and T. D. C. Little, the user has to examine a story board having listed therein enormous shots having been extracted. Understanding of such a story board will be a great burden to the user. Also, a dialogue scene in which for example two persons are talking will be considered here. In the dialogue, the two persons are alternately shot by a camera each time either of them speaks. Therefore, many of such shots extracted by the conventional image extraction technique are redundant. The shots contain many useless information since they are at too low level as objects from which a video structure is to be extracted. Thus, the conventional image extraction technique cannot be said to be convenient for extraction of such shots by the user.

In addition to the above, further image extraction techniques have been proposed as disclosed in "A. Merlino, D. Morey and M. Maybury: Broadcast News Navigation Using Story Segmentation, Proceeding of ACM Multimedia 97, 1997" and the Japanese Unexamined Patent Publication No. 10-136297, for example. However, these techniques can only be used with very professional knowledge of limited genres of contents such as news and football game. These conventional image extraction techniques can assure a good result when directed for such limited genres but will be of no use for other than the limited genres. Such limitation of the techniques to special genres makes it difficult for the technique to easily prevail widely.

Further, there has been proposed a still another image extraction technique as disclosed in the U.S. Pat. No. 5,708,767 for example. It is to extract a so-called story unit. However, this conventional image extraction technique is not any completely automated one and thus a user's intervention is required to determine which shots have the same content. Also this technique needs a complicated computation for signal processing and is only applicable to video information.

Furthermore, a still another image extraction technique has been proposed as in the Japanese Unexamined Patent Publication No. 9-214879, for example, in which shots are identified by a combination of shot detection and silent period detection. However, this conventional technique can be used only when the silent period corresponds with a boundary between shots.

Moreover, a yet another image extraction technique has been proposed as disclosed in "H. Aoki, S. Shimotsuji and O. Hori: A Shot Classification Method to Select Effective Key-Frames for Video Browsing, IPSJ Human Interface SIG Notes, 7:43–50, 1996" and the Japanese Unexamined Patent Publication No. 9-93588 for example, in which repeated similar shots are detected to reduce the redundancy of the depiction in a story board. However, this conventional image extraction technique is only applicable to visual information, not to audio information.

Further, the conventional image extraction techniques can only detect a so-called local video structure and a general video structure which is based on a special knowledge.

DISCLOSURE OF THE INVENTION

Accordingly, the present invention has an object to overcome the above-mentioned drawbacks of the prior art by providing a signal processing method and video signal processor, which can extract a high-level video structure in a variety of video data.

The above object can be attained by providing a signal processing method for detecting and analyzing a pattern reflecting the semantics of the content of a signal, the method including, according to the present invention, steps of: extracting, from a segment consisting of a sequence of consecutive frames forming together the signal, at least one feature which characterizes the properties of the segment; calculating, using the extracted feature, a criterion for measurement of a similarity between a pair of segments for every extracted feature and measuring a similarity between a pair of segments according to the similarity measurement criterion; and detecting, using the feature and similarity determination criterion, a similarity chain consisting of two or more, similar to each other, of the segments.

In the above signal processing method according to the present invention, a basic structure pattern of similar segments in the signal are detected.

Also the above object can be attained by providing a video signal processor for detecting and analyzing a visual and/or audio pattern reflecting the semantics of the content of a supplied video signal, the apparatus including according to the present invention: means for extracting, from a visual and/or audio segment consisting of a sequence of consecutive visual and/or audio frames forming together the video signal, at least one feature which characterizes the properties of the visual and/or audio segment; means for calculating, using the extracted feature, a criterion for measurement of a similarity between a pair of visual segments and/or audio segments for every extracted feature and measuring a similarity between a pair of visual segments and/or audio segments according to the similarity measurement criterion; and means for detecting, using the feature and similarity determination criterion, a similarity chain consisting of two or more, similar to each other, of the visual and/or audio segments.

In the above video signal processor according to the present invention, a basic structure pattern of similar visual and/or audio segments in the video signal are detected.

BEST MODE FOR CARRYING OUT THE INVENTION

The embodiment of the present invention will further be described below with reference to the accompanying drawings.

The embodiment of the present invention is the video signal processor in which a desired content is automatically detected and extracted from a recorded video data. More particularly, the video signal processor is intended to detect and analyze a structure pattern of an image and/or sound, reflecting a semantics on which a video data is based. For the purpose of this analysis, a concept of "similarity chain" (will be referred to as "chain" where necessary hereinafter) is introduced. Before proceeding to the description of the video signal processor, a video data to which the present invention is applicable will first be described.

Figure 1:
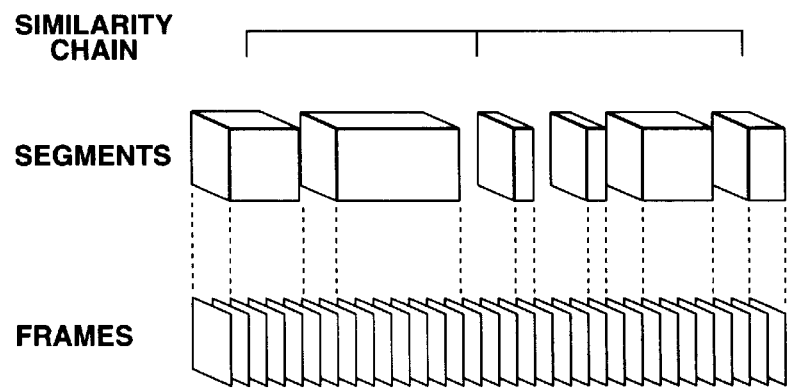
FIG. 1 explains the structure of a video data to which the present invention is applicable, using a video data model.

FIG. 1 shows a video data model having a hierarchy of three levels such as frames, segments and a similarity chain, to which the present invention is applicable. As seen, the video data model includes a sequence of frames at the lowest level. Also the video data model includes a sequence of consecutive segments at a level one step higher than the level of the frames. Further, the video data model includes, at the highest level, a similarity chain consisting of a sequence of segments each having a certain similarity pattern.

The video data includes both visual information and audio information. That is, the frames in the video data include visual frames each being a single still image, and audio frames representing audio information having generally been sampled for a time as short as tens to hundreds of milliseconds.

As in the video data model, each of segments is comprised of a sequence of visual frames having consecutively been picked up by a single camera. Generally, the segment is called "shot". The segments include visual segments and/or audio segments, and each segment is the fundamental unit of a video structure. Especially, the audio segments among these segments can be defined in many different manners as will be described below by way of example. First, audio segments are bounded by periods of silence, respectively, in a video data detected by the well-known method, as the case may be. Also, in some cases, each audio segment is formed from a sequence of audio frames classified in several categories such as speech, music, noise, silence, etc. as disclosed in "D. Kimber and L. Wilcox: Acoustic Segmentation for Audio Browsers, Xerox Parc Technical Report". Further, in other cases, the audio segments are determined based on an audio cut point which is a large variation of a certain feature from one to the other of two successive audio frames, as disclosed in " S. Pfeiffer, S. Fischer and E. Wolfgang: Automatic Audio Content Analysis, Proceeding of ACM Multimedia 96, November 1996, pp21–30", for example.

In the video data, the similarity chain consists of plurality of segments similar to each other and ordered in time, and has a structure pattern which is classified into some kinds depending upon the relation between the similar segments included in the chain and constraints on the pattern . The similarity chain is a one consisting of a series of segments $S_{i1}, \ldots, S_{ik}$ for all of which $j=1, \ldots, k-1: i_j < i_{j+}$ is applicable. The index $i_j$ represents a segment number in an original video data in which the segment is included, and the suffix j to the reference i indicates that in the similarity chain, the segment is at the j-th position on the time base. Note that since the similarity chain includes temporally discrete segments, there exists a time gap between the elements in the chain in some cases. In other words, the segments $S_{ij}$ and $S_{ij+1}$ are not always contiguous to each other in the original video data in which they are included.

Using the similarity chain, it is possible to obtain an important key to both the local and global video structures in a video data, which will further be described later. Generally, a video data includes keys by which the user can perceptually know the outline of the video data. The simplest and most important one of the keys is a structure pattern of similar visual segments or audio segments. The structure pattern is the very information that has to be acquired using the similarity chain.

The similarity patterns include a basic similarity pattern, liked similarity pattern, local chain and cyclic pattern, which are the most important basic ones for the video data analysis.

It should be noted that the "basic similarity chain" is such a one that all segments included therein are similar to each other. However, there is no restraint to the structure pattern of the segments. Such a baric similarity chain can be obtained using a grouping algorithm or clustering algorithm for grouping the segments. Also, the "linked similarity chain" is a one in which adjacent segments included therein are similar to each other. The "local chain" is a one in which a time interval between each pair of adjacent segments is shorter than a predetermined time. In the "cyclic chain", each segment is similar to a rear m-th segment. Namely, the cyclic chain consists of m segments repeated in a similar manner.

These similarity chains can be used to extract a local video structure such as a scene in a video data and a global video structure such as a news item, as will be described later.

Note that the "scene" is a significant organization of segments having been acquired by detecting visual segments (shots) or audio segments, grouped based on a feature indicative of an intra-segment perceptive activity amount for example. The scene is subjective and depends upon the content or genre of a video data. However, it is assumed herein that the scene is a group of repeated patterns of video or audio segments whose features are similar to each other.

Figure 2:
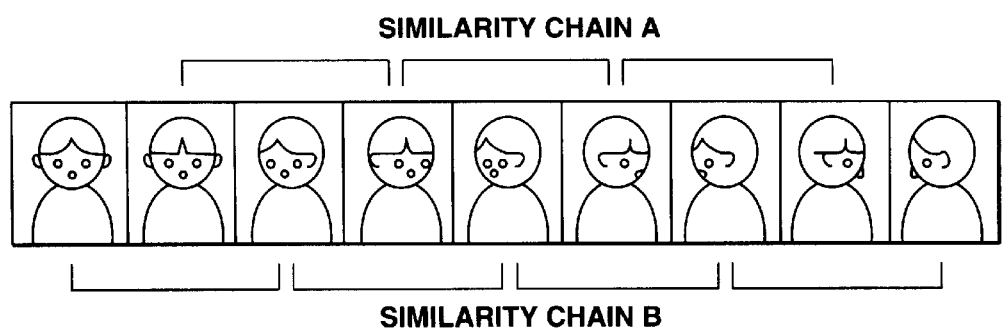
FIG. 2 explains a similarity chain for use to extract a local video structure.

Referring now to FIG. 2, there is explained an example of the similarity chain for use to extract a local video structure. In the example shown in FIG. 2, visual segments of two persons talking to each other in a dialogue situation appear alternately as one of them is talking. In a video data having such a repeated pattern, each visual segment is composed of two temporally overlapping chains for each segment components A and B. Thus, such temporally overlapping local chains are usable to detect a group of relevant visual segments or a scene.

Figure 3:
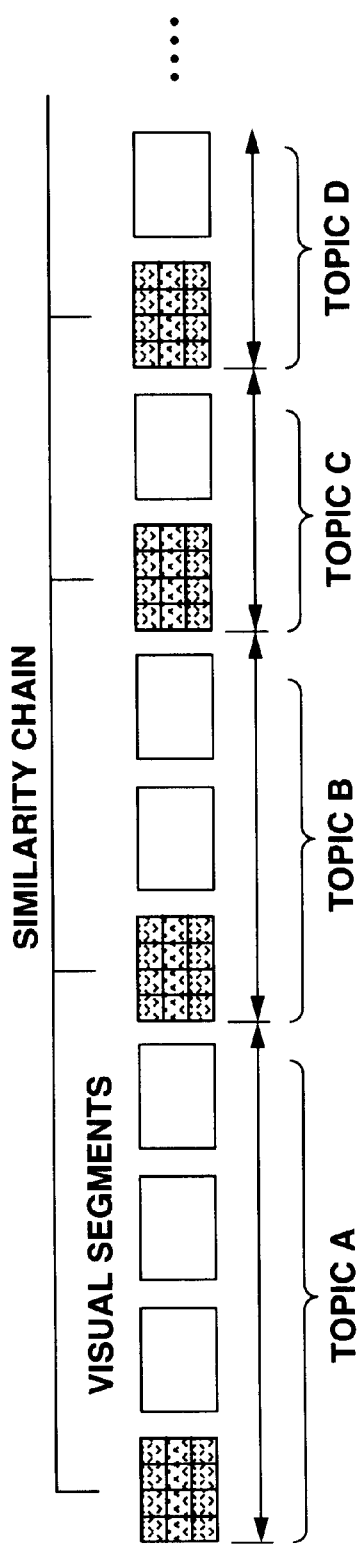
FIG. 3 explains a similarity chain for use to extract a global video structure.

Referring now to FIG. 3, there is explained an example of the similarity chain for use to extract a global video structure. Here, a news program having a fixed structure will be considered. In such a video data, first, segments of a news caster introducing news items appear for each news item, and then segments of a correspondent making a report at site appear, for example. In the video data having the fixed structure, the repeatedly appearing visual segments of the news caster form together a global chain. Since the segments of the news caster represent news items, respectively, a news item can automatically be detected using th global chain. Namely, the global chain can be used to detect each topic from a video data composed of a plurality of news items being topics A, B, C, D, . . . as shown in FIG. 3.

Figure 4:
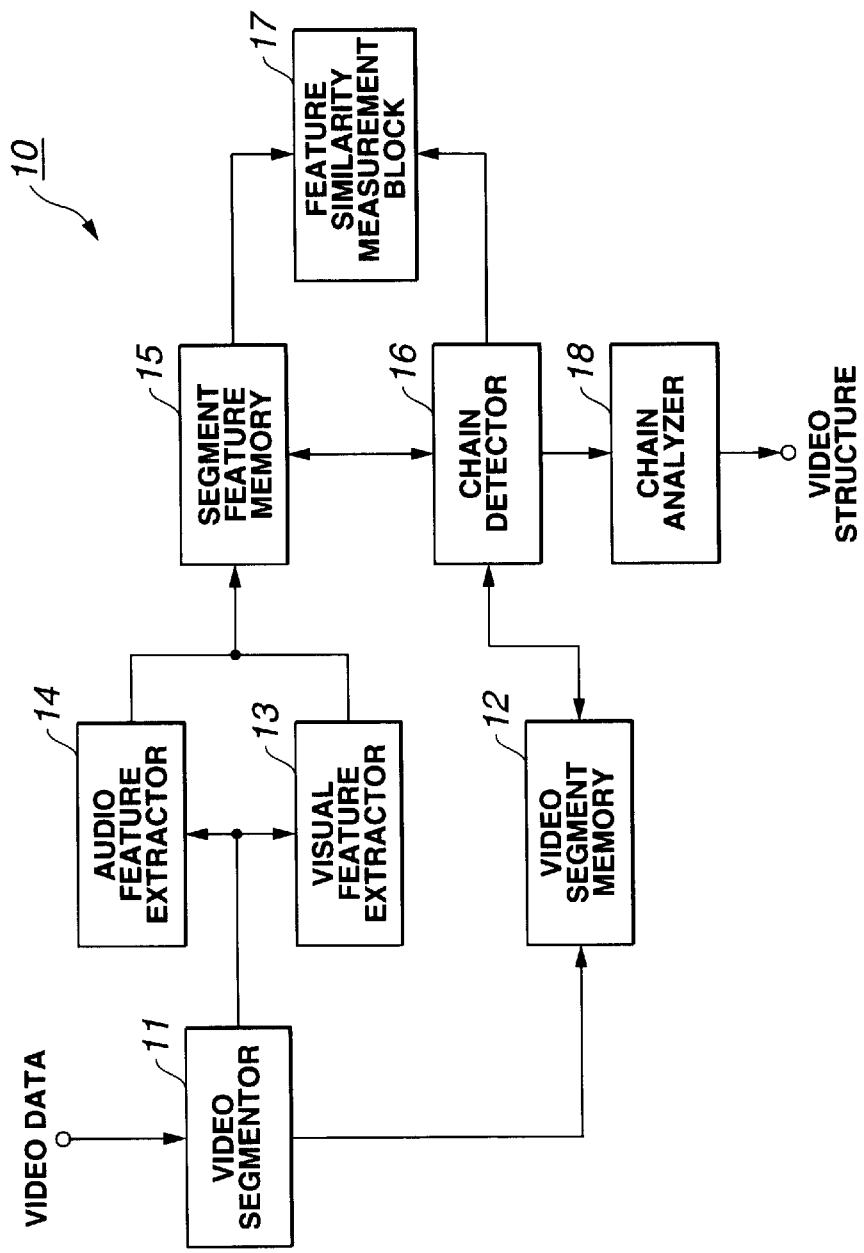
FIG. 4 is a block diagram of an embodiment of the video signal processor according to the present invention.

Referring now to FIG. 4, there is schematically illustrated the video signal processor according to the present invention. The video signal processor is generally indicated with a reference 10. In the video signal processor 10, the features of segments in the video data are used to determine a similarity between segments, and automatically detect the above-mentioned similarity chain. Thus, the video signal processor 10 is applicable to both visual and audio segments. Further, the video signal processor 10 can analyze the similarity chain to extract and reconstruct a scene being a local video structure, and a high-level structure being a global video structure such as a topic.

As shown in FIG. 4, the video signal processor 10 includes a video segmentor 11 to segment or divide an input video data stream into visual or audio segments or into both, a video segment memory 12 to store the segments of the video data, a visual feature extractor 13 to extract a feature for each visual segment, an audio feature extractor 14 to extract a feature for each audio segment, a segment feature memory 15 to store the features of the visual and audio segments, a chain detector 16 in which the visual and audio segments are grouped into a chain, a feature similarity measurement block 17 to determine a similarity between two segments, and a chain analyzer 18 to detect and analyze a variety of video structures.

The video segmentor 11 is supplied with a video data stream consisting of visual and audio data in any one of various digital formats including compressed video formats such as Moving Picture Experts Group Phase 1 (MPEG1), Moving Picture Experts Group Phase 2 (MPEG2) and digital video (DV), and divides the video data into visual or audio segments or into both segments. When the input video data is in a compressed format, the video segmentor 11 can directly process the compressed video data without fully expanding it. The video segmentor 11 divides the input video data into visual or audio segments or into both segments. Also, the video segmentor 11 supplies the downstream video segment memory 12 with information segments resulted from the segmentation of the input video data. Further, the video segmentor 11 supplies the information segments selectively to the downstream visual feature extractor 13 and audio feature extractor 14, depending upon whether the information is visual or audio segments.

The video segment memory 12 stores the information segments of video data supplied from the video segmentor 11. Also the video segment memory 12 supplies the information segments to the chain detector 16 upon query from the chain detector 16.

The visual feature extractor 13 extracts a feature for each visual segment resulted from segmentation of the video data by the video segmentor 11. The visual feature extractor 13 can process a compressed video data without fully expanding it. It supplies the extracted feature of each visual segment to the downstream segment feature memory 15.

The audio feature extractor 14 extracts a feature for each audio segment resulted from segmentation of the video data by the video segmentor 11. The audio feature extractor 14 can process a compressed audio data without fully expanding it. It supplies the extracted feature of each audio segment to the downstream segment feature memory 15.

The segment feature memory 15 stores the visual and audio segment features supplied from the visual and audio feature extractors 13 and 14, respectively. Upon query from the downstream feature similarity measurement block 17, the segment feature memory 15 supplies stored features and segments to the feature similarity measurement block 17.

Using the information segments stored in the video segment memory 12 and the similarity between a pair of segments, the chain detector 16 groups the visual and audio segments into chains, respectively. The chain detector 16 starts with each segment in a group to detect a repeated pattern of similar segments in a group of segments, and group such segments into the same chain. Then, after grouping candidate for chains, the chain detector 16 determines a final set of chains at a second filtering step. The chain detector 16 supplies the detected chains to he downstream chain analyzer 18.

The feature similarity measurement block 17 determines a similarity between two segments, and queries the segment feature memory 15 to retrieve the feature for a certain segment.

The chain analyzer 18 analyzes the chain structure detected by the chain detector 16 to detect a variety of local and global video structures. The chain analyzer 18 can adjust the details of the video structures according to a special application as will be described in detail later.

Figure 5:
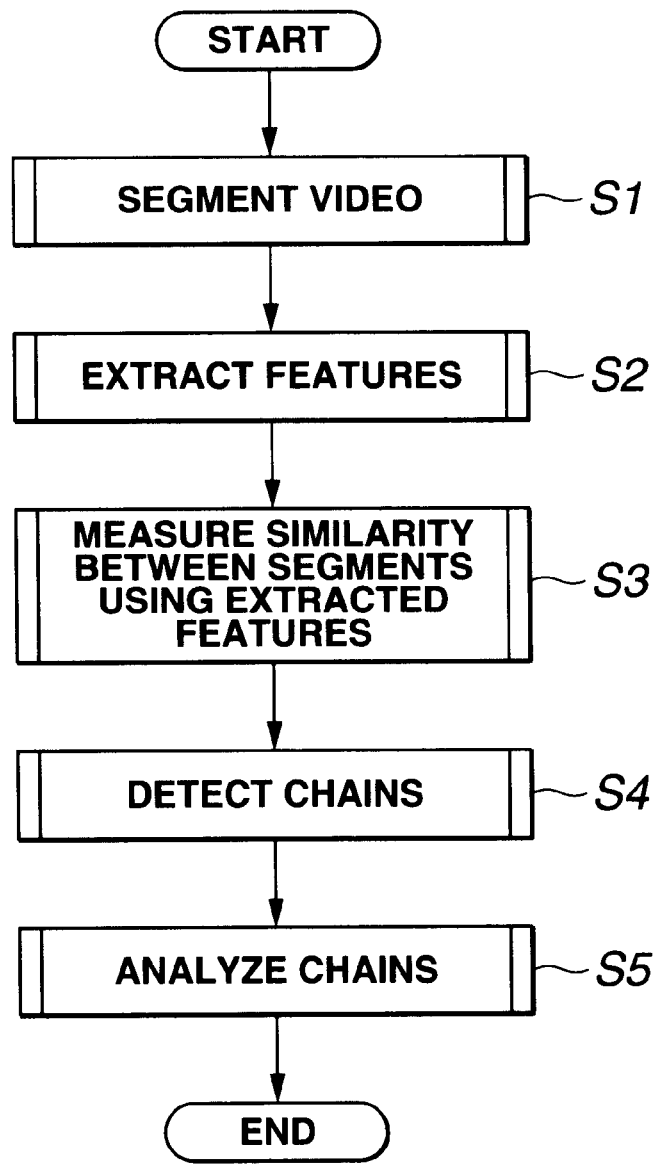
FIG. 5 is a flow chart of a series of operations effected in detecting, for analysis, a video structure in the video signal processor.

The video signal processor 10 detects a video structure by effecting a series of operations as outlined in FIG. 5 using the similarity chains.

First at step S1 in FIG. 5, the video signal processor 10 divides a video data into visual or audio segments as will be described below. The video signal processor 10 divides a video data supplied to the video segmentor 11 into visual or audio segments or possibly into both segments. The video segmenting method employed in the video signal processor 10 is not any special one. For example, the video signal processor 10 segments a video data by the method disclosed in the previously mentioned "G. Ahanger and T. D. C. Little: A Survey of Technologies for Parsing and Indexing Digital Video, Journal of Visual Communication and Image Representation 7: 28–4, 1996". This video segmenting method is well known in this field of art. The video signal processor 10 according to the present invention can employ any video segmenting method.

Next at step S2, the video signal processor 10 extracts a feature. More specifically, the video signal processor 10 calculates a feature which characterizes the properties of a segment by means of the visual feature extractor 13 and audio feature extractor 14. In the video signal processor 10, for example, a time duration of each segment, visual or visual features such as color histogram and texture feature, audio features such as frequency analysis result, level and pitch, activity determination result, etc. are calculated as applicable features. Of course, the video signal processor 10 according to the present invention is not limited to these applicable features.

Next at step S3, the video signal processor 10 measures a similarity between segments using their features. More specifically, the video signal processor 10 measures a dissimilarity between segments by the feature similarity measurement block 17 and determines how similar two segments are to each other according to the feature similarity measurement criterion of the feature similarity measurement block 17. Using the features having been extracted at step S2, the video signal processor 10 calculates a criterion for measurement of dissimilarity.

Then the video signal processor 10 detects a chain at step S4. Namely, the video signal processor 10 detects a chain of similar segments using the dissimilarity measurement criteria having been calculated at step S3 and the features having been extracted at step S2.

The video signal processor 10 analyzes the chain at step S5. More specifically, the video signal processor 10 uses the chain detected at step S4 to determine and output a local and/or global video structure of video data.

With the above series of operations, the video signal processor 10 can detect a chain structure from a video data. Therefore, using the result, the user can index and sum the content of the video data and quickly access to points of interest in the video data.

The operation of the video signal processor 10 at each of the steps shown in FIG. 5 will further be described below.

The video segmentation at step S1 will be discussed herebelow. The video signal processor 10 divides a video data supplied to the video segmentor 11 into visual or audio segments or possibly into both segments. Many techniques are available for automatic detection of a boundary between segments in a video data. As mentioned above, the video signal processor 10 according to the present invention is not limited to any special video segmenting method. On the other hand, the accuracy of chain detection in the video signal processor 10 substantially depends upon the accuracy of the video segmentation which is to be done before the chain detection.

Next, the extraction of features at step S2 will be described. The "features" are attributes of segments characterizing the properties of the segments and providing data with which a similarity between different segments is determined. In the video signal processor 10, the visual and audio feature extractors 13 and 14 calculate feature of each segment. The video signal processor 10 is not limited to any details of features. The features considered to be effectively usable in the video signal processor 10 include visual feature, audio feature and visual-audio features as will be described below. The requirement for these features usable in the video signal processor 10 is that they should be ones from which a dissimilarity can be determined. For a higher efficiency of signal processing, the video signal processor 10 has to effect simultaneously effects a feature extraction and video segmentation as the case may be. The features which will be described below meet the above requirement.

The features include first a one concerning an image (will be referred to as "visual feature" hereinafter). A visual segment is composed of successive visual frames. Therefore, by extracting an appropriate one of the visual segments, it is possible to represent the depicted content of the visual segment by the extracted visual frame. Namely, a similarity of the appropriately extracted visual frame can be used as a similarity between visual segments. Thus, the visual feature is an important one of the important features usable in the video signal processor 10. The visual feature can represent by itself only static information. Using a method which will be described later, the video signal processor 10 can extract a dynamic feature of visual segments based on the visual feature.

In the video signal processor 10, colors of images are important materials for determination of a similarity between two images. The use of a color histogram for determination of a similarity between images is well known as disclosed in, for example, "G. Ahanger and T. D. C. Little: A Survey of Technologies for Parsing and Indexing Digital Video, Journal of Visual Communication and Image Representation 7: 28–4, 1996". It should be noted that the color histogram is acquired by dividing a three-dimensional space such as HSV, RGB or the like for example into n areas and calculating a relative ratio of frequency of appearance in each area of pixels of an image. Information thus acquired gives an n-dimensional vector. Also, a color histogram can be extracted directly from a compressed video data as disclosed in the U.S. Pat. No. 5,708,767.

The video signal processor 10 uses a 64-dimensional ($=2^{2 \cdot 3}$-dimensional) histogram vector acquired by sampling, at a rate of 2 bits per color channel, an original YUV color space in images forming a segment.

Such a histogram represents a total color tone of an image but includes no timing data. For this reason, a video correlation is calculated as another visual feature in the video signal processor 10. For the chain detection in the video signal processor 10, mutual overlapping of a plurality of similar segments is an important index indicating that the segments form together a chain structure. For example, in a dialogue scene, the camera is moved between two persons alternately and to one of them being currently speaking. Usually, for shooting the same person again, the camera is moved back to nearly the same position where he or she was previously shot. Since it has been found that for detection of such a scene structure, a correlation based on reduced grayscale images is a good index for a similarity between segments, initial images are thinned and reduced to grayscale images each of M×N (both M and N may be small values; for example, M×N may be 8×8) in size and a video correlation is calculated using the reduced grayscale images in the video signal processor 10. That is, the reduced gray scale images are interpreted as an MN-dimensional feature vector.

The features different from the above-mentioned visual feature concern a sound. This feature will be referred to as "audio feature" hereinafter. The audio feature can represent the content of an audio segment. In the video signal processor 10, a frequency analysis, pitch, level, etc. may be used as audio features. These audio features are known from various documents.

First, the video signal processor 10 can make a frequency analysis of a Fourier Transform component or the like to determine the distribution of frequency information in a single audio frame. For example, the video signal processor 10 can use FFT (Fast Fourier Transform) component, frequency histogram, power spectrum and other features.

Also, the video signal processor 10 may use pitches such as a mean pitch and maximum pitch, and sound levels such as mean loudness and maximum loudness, as effective audio features for representation of audio segments.

The cepstrum feature used in the video signal processor 10 includes a cepstrum factor and its primary and secondary differential coefficients and may be a cepstrum spectral factor obtained from FFT spectrum or LPC (linear predictive coding).

Further features are those common to image and sound. They are neither any visual feature nor audio feature, but provide useful information for representation of features of segments included in a chain. The video signal processor 10 uses an activity, as common visual-audio feature.

The activity is an index indicating how dynamic or static the content of a segment feels. For example, if a segment visually feels dynamic, the activity represents a rapidity with which a camera is moved along an object or with which an object being shot by the camera changes.

The activity is indirectly calculated by measuring a mean value of inter-frame dissimilarity in feature such as color histogram. A video activity $V_F$ is given by the following equation (1):

$$F = \frac{\sum_{j=b}^{f-1} d_F(i, i+1)}{f - b} \quad (1)$$

where i and j are frames, F is a feature measured between the frames i and j, $d_F(i, j)$ is a dissimilarity measurement criterion for the feature $d_F$, and b and f are numbers for a first frame and last frame in one segment.

More specifically, the video signal processor 10 can calculate the video activity $V_F$ using the above-mentioned histogram for example.

The features including the above-mentioned visual features basically indicate static information of a segment as in the above. To accurately represent the feature of a segment, however, dynamic information has to be taken in consideration. For this reason, the video signal processor 10 represents dynamic information by a feature sampling method which will be described below.

Figure 6:
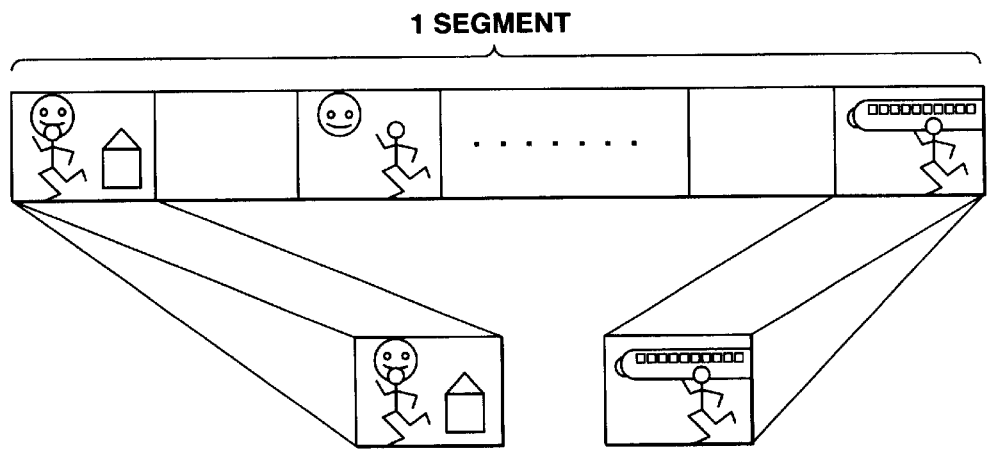
FIG. 6 explains the sampling of dynamic feature in the video signal processor.

As shown in FIG. 6 for example, the video signal processor 10 extracts more than one static feature, starting at different time points in one segment. At this time, the video signal processor 10 determines the number of features to extract by keeping a balance between a highest fidelity of segment depiction and a minimum data redundancy. For example, when a certain image in the segment can be designated as a key frame in that segment, a histogram calculated from the key frame will be a feature to sample.

Here, it will be considered that a certain sample is always selected at a predetermined time point, for example, at the last time point in a segment. In this case, samples from two arbitrary segments changing to black frames (fading) will be same black frames, so that no different features will possibly be acquired. That is, selected two frames will be determined to be extremely similar to each other whatever the image contents of such segments are. This problem will take place since the samples are not good central values.

For this reason, the video signal processor 10 is adapted not to extract a feature at such a fixed point but to extract a statistically central value in an entire segment. Here, the general feature sampling method will be described concerning two cases that (1) a feature can be represented as a real-number n-dimensional vector and (2) only a dissimilarity measurement criterion can be used. It should be noted that best-known visual and audio features such as histogram, power spectrum, etc. are included in the features in the case (1).

In the case (1), the number of samples is predetermined to be k and the video signal processor 10 automatically segments a feature of an entire segment into k different groups by using the well-known k-means clustering method as disclosed in "L. Kaufman and P. J. Rousseeuw: Finding Groups in Data: An Introduction to Cluster Analysis, John-Wiley and Sons, 1990". The video signal processor 10 selects, as a sample value, a group centroid or a sample approximate to the centroid from each of the k groups. The complexity of the operations in the video signal processor 10 is just the linearly increased number of samples.

On the other hand, in the case (2), the video signal processor 10 forms the k groups by the use of the k-medoids algorithm method also disclosed in "L. Kaufman and P. J. Rousseeuw: Finding Groups in Data: An Introduction to Cluster Analysis, John-Wiley and Sons, 1990". The video signal processor 10 uses, as a sample value, the above-mentioned group medoid for each of the k groups.

It should be noted that in the video signal processor 10, the method for establishing the dissimilarity measurement criterion for features representing extracted dynamic features is based on the dissimilarity measurement criterion for static features on which the former method is based, which will further be described later.

Thus, the video signal processor 10 can extract a plurality of static features to represent a dynamic feature using the plurality of static features.

As in the above, the video signal processor 10 can extract various features. However, each of such features is generally insufficient for representation, by itself, of a segment feature. For this reason, the video signal processor 10 can select a set of mutually complementary features by combining these different features. For example, the video signal processor 10 can provide more information than that of each feature by combining the above-mentioned color histogram and image correlation with each other.

Next, the measurement of similarity between segments, in which the features acquired at step S3 in FIG. 5 are used, will be described herebelow. Using the dissimilarity measurement criterion being a function to calculate a real-number value with which it is determined how dissimilar two features are to each other, the video signal processor 10 measures a dissimilarity between the segments by means of the feature similarity measurement block 17. When the dissimilarity measurement criterion is small, it indicates that two features are similar to each other. If the criterion is large, it indicates that the two features are not similar to each other. The function for calculation of the dissimilarity between the two segments S1 and S2 concerning the feature F is defined as dissimilarity measurement criterion $d_F(S_1, S_2)$. This function meets the relation given by the equations (2) below.

$$d_F(S_1, S_2) = 0 \quad \text{(when } S_1 = S_2\text{)} \quad (2)$$
$$d_F(S_1, S_2) = 0 \quad \text{(for all } S_1 \text{ and } S_2\text{)}$$
$$d_F(S_1, S_2) = d_F(S_2, S_1) \quad \text{(for all } S_1 \text{ and } S_2\text{)}$$

It should be noted that some of the dissimilarity measurement criteria is only applicable to specific features. However, as disclosed in "G. Ahanger and T. D. C. Little: A Survey of Technologies for Parsing and Indexing Digital Video, Journal of Visual Communication and Image Representation 7: 28–4, 1996", and "L. Kaufman and P. J. Rousseeuw: Finding Groups in Data: An Introduction to Cluster Analysis, John-Wiley and Sons, 1990", many dissimilarity measurement criteria are generally applicable to the measurement of a similarity between features represented as points in a n-dimensional space. The features include a Euclidean distance, inner product, L1 distance, etc. Since of these features, the L1 distance will effectively act on various features including the histogram, image correlation, etc., the video signal processor 10 adopts the L1 distance as a feature. On the assumption that two n-dimensional vectors are A and B, the L1 distance $d_{L1}(A, B)$ is given by the following equation (3):

$$d_{L1}(A, B) = \sum_{i=1}^{n} |A_i - B_i| \quad (3)$$

where the subscript i indicates the i-th element of each of the n-dimensional vectors A and B.

As mentioned above, the video signal processor 10 extracts, as features representing dynamic features, static features at different time points in a segment. Then, to determine a similarity between two extracted dynamic features, the video signal processor 10 uses, as a criterion for determination of a dissimilarity, a criterion for measurement of a dissimilarity between the static features on which the similarity measurement criterion is based. In many cases, the dissimilarity measurement criterion for the dynamic features should most advantageously be established using a dissimilarity between a pair of static features selected from each dynamic feature and most similar to each other. In this case, the criterion for measurement of a dissimilarity between two extracted dynamic features $SF_1$ and $SF_2$ is given by the following equation (4):

$$d_S(SF_1, SF_2) = \overset{\min}{F_1 \in SF_1, F_2 \in SF_2} d_F(F_1, F_2) \quad (4)$$

The function $d_F(F_1, F_2)$ in the equation (4) above indicates a criterion for measurement of a dissimilarity between the static features F on which the equation (4) is based. It should be noted that the a maximum or mean value of the dissimilarity between features may be taken instead of a maximum value as the case may be.

In the video signal processor 10, only one feature is insufficient to determine a similarity between segments, and so in many cases it is necessary to combine information derived from many features for the same segment. A solution for this problem is to calculate a dissimilarity based on various features as a combination of respective features as weighted. That is, when there are available k features $F_1$, $F_2$, ..., $F_k$, the video signal processor 10 uses a dissimilarity measurement criterion $d_F(S_1, S_2)$ for combined features. The criterion is given by the following equation (5):

$$d_F(S_1, S_2) = \sum_{i=1}^{k} w_i d_{Fi}(S_1, S_2) \quad (5)$$

where $\{w_i\}$ is a weighting factor of $\Sigma_i w_i = 1$.

As in the above, the video signal processor 10 can calculate a dissimilarity measurement criterion using features having been extracted at step S2 in FIG. 5 to determine a similarity between segments in consideration.

Next, the chain detection effected at step S4 in FIG. 5 will be explained. The video signal processor 10 uses the dissimilarity determination criterion and extracted features to detect a similarity chain indicatives of a linkage between similar segments. First, some types of similarity chains will be defined and algorithms for detection of each type of similarity chain will be described in detail.

It should be noted that since the similarity chains which will be defined below are independent of each other, one similarity chains may belong to more than one similarity chain type in the video signal processor 10. Therefore, the similarity chains will be referred to using combinations of the defined type names. For example, the "local uniform linked chain" refers to a similarity chain having features of local, uniform, and linked similarity chains as will be described later.

The similarity chains are generally grouped into ones in which the relation between similar segments is restricted and ones whose structure is restricted. In the following definition, a "chain C" means a series of segments $S_{i_1}, \ldots, S_{i_m}$. The index $i_k$ represents a segment number in a video data in which the segment is included, and the suffix k to the reference i indicates that in the similarity chain, the segment is at the k-th position on the time base. Also, a series of segments is always ordered on the time base. For all k's being 1, ..., m−1, respectively, $i_k < i_{k+1}$. Further, |C| indicates the length of a chain. $C^{start}$ and $C^{end}$ indicate a start time and end time, respectively, of the chain C in the video data. More precisely, the start time of the chain C is a start time of the first segment in the chain C and the end time of the chain C is an end time of the last segment in the chain C. Moreover, when a certain segment is taken as A, segments similar to the segment are indicated with references A', A", A"', .... Finally, the similarity between two segments means that the dissimilarity determination criterion for them is smaller than a dissimilarity threshold which will further be described later. This is defined as "similar $(S_1, S_2)$".

The similarity chain in which the relation between similar segments included in the similarity chain is restricted includes the basic, linked and cyclic similarity chains.

Figure 7:
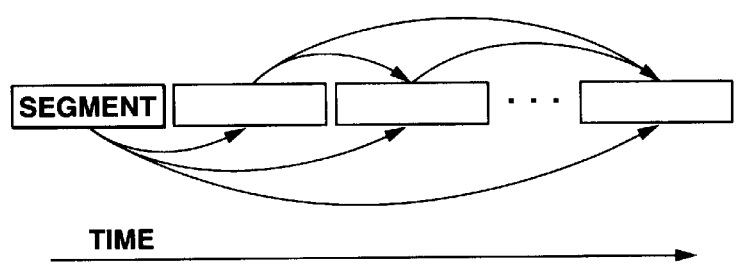
FIG. 7 explains a basic similarity chain.

First, the basic similarity chain is a chain C in which all segments are similar to each other as shown in FIG. 7. Note that there is no structural restriction for the basic similarity chain. In many cases, the basic similarity chain is obtained using a grouping algorithm or clustering algorithm for grouping similar segments.

Figure 8:
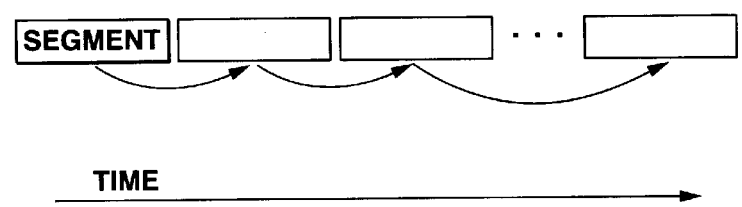
FIG. 8 explains a linked similarity chain.

Next, the linked similarity chain is a chain C in which adjacent segments are similar to each other as shown in FIG. 8. Namely, in the linked similarity chain, a definition "similar $(S_k, S_{k+1})$" applies for all k's being 1, ..., |C|−1. When a certain segment is taken as A, the segments in this similarity chain can be indicated with references A', A", A"', ....

Figure 9:
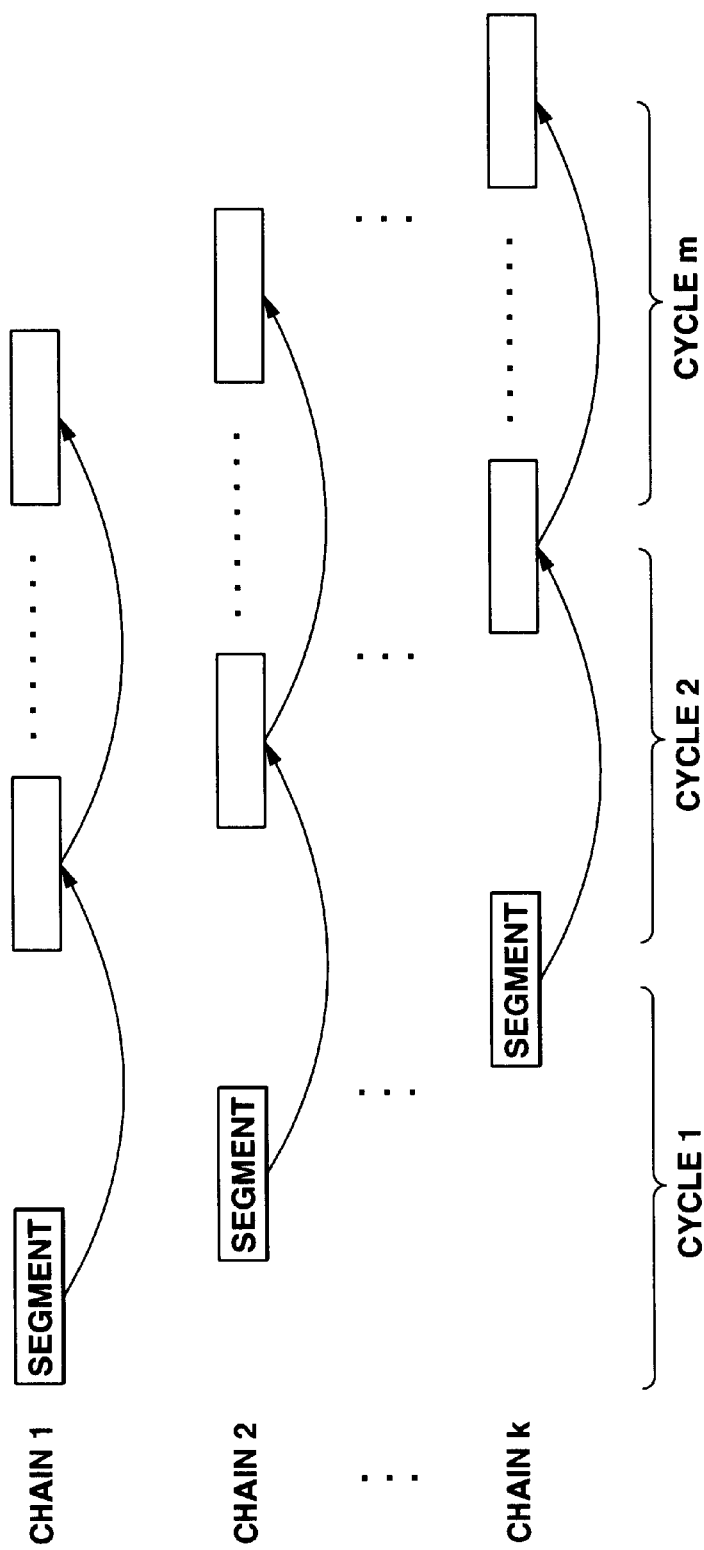
FIG. 9 explains a cyclic chain.

Further, the cyclic chain is a chain $C_{cyclic}$ in which each segment is similar to the rear m-th segment as shown in FIG. 9. That is, the definition "similar $(S_k, S_{k+1})$" applies for all k's being 1, ..., $|C_{cyclic}|-1$. In other words, the cyclic chain is composed of an approximate repetition of a series of m segments. Thus, the cyclic chains can be indicated with references $S_1, S_2, \ldots, S_m, S_1', S_2', \ldots, S_m', S_1'', S_2'', \ldots, S_m'', \Lambda, S_1''', S_2''', \ldots, S_m'''$.

On the other hand, the similarity chains whose structure is restricted include the local and uniform chains.

The local chain is a chain C in which the time interval between each pair of adjacent segments is shorter than a predetermined time as having been described in the above. Namely, in the local chain, when the maximum permissible time interval between two segments in the chain is taken as "gap", $i_{k+1}-i_k \leq gap$ for the adjacent segments $S_{ik}$ and $S_{ik+1}$ when all k's are 1, ..., $|C|-1$, respectively.

When segments in the chain appear at nearly equal time intervals, this fact can be an important index for an important video structure. Such a chain C is defined as "uniform chain". Note that the uniformity (C) of the chain C is defined to be a mean value of deviations of the time interval from the equal time interval, which is normalized by the length of the chain as given by the following expression (6):

$$uniformity(C) = \frac{\sum_{i=1}^{|C|-1} \left| (S_{i+1}^{start} - S_i^{start}) - \frac{(C^{end} - C^{start})}{|C|} \right|}{|C| \cdot |C^{end} - C^{start}|} \quad (6)$$

The "uniformity (C)" of the chain C given by the expression (6) takes a value ranging from 0 to 1. When the value is small, the time interval distribution of the segments are nearly uniform. When the value of the "uniformity (C)" has a value smaller than a predetermined uniformity threshold, the chain C is regarded as a uniform chain.

The operations for detection of the variety of chains, effected in the video signal processor 10 will be described herebelow:

The video signal processor 10 adopts the batch clustering technique or consecutive clustering technique for detecting the basic similarity chain.

The batch clustering technique is to detect chains collectively. For adoption of this technique, however, it is necessary to terminate all the video segmentation before the chain detection. On the other hand, the consecutive clustering technique is to detect chains one after another. When the video segmentation and feature extractions are effected consecutively, it is possible to reproduce a video data and analyze the video data consecutively. Further, when the video signal processor 10 has a sufficient computing capability, the consecutive chain detection can be real-time effected, in other words, chains can be detected while video data is being acquired or recorded. In some cases, however, the consecutive video analysis will show a problem of accuracy. That is to say, in the consecutive clustering technique, there is available no global information for determination of an optimum chain structure, and the consecutive clustering is susceptible to the order in which segments are supplied as input. Thus, this consecutive clustering will result in a low quality.

Figure 10:
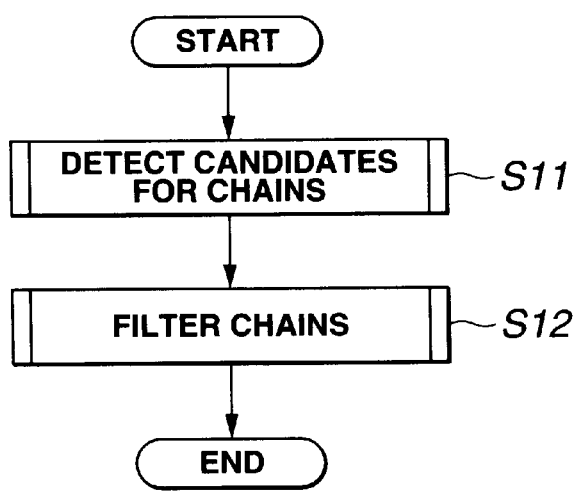
FIG. 10 explains a series of operations effected in detecting a basic similarity chain using the batch clustering technique in the video signal processor.

In case the video signal processor 10 adopts the batch clustering technique, it operates in two steps to detect basic similarity chains as shown in FIG. 10.

First at step S11, the video signal processor 10 detects candidate chains. More particularly, the video signal processor 10 detects similar segments in video data and groups them into a cluster. The cluster group of segments thus obtained will be an initial candidate in detection of basic similarity chains.

The video signal processor 10 can use an arbitrary clustering technique when determining initial candidate similarity chains. However, the video signal processor 10 will adopt the hierarchical clustering method disclosed in "L. Kaufman and P. J. Rousseeuw: Finding Groups in Data: An Introduction to Cluster Analysis, John-Wiley and Sons, 1990". This algorithm is such that two most similar segments are paired and the inter-cluster similarity determination criterion is used to pair most similar clusters at each level. In this algorithm, a criterion $d_c(C_1, C_2)$ for determination of a dissimilarity between two clusters $C_1$ and $C_2$ is defined as a minimum similarity between two segments included in each cluster. It is given by the following equation (7):

$$d_c(C_1, C_2) = \min_{S_1 \in C_1, S_2 \in C_2} d_s(S_1, S_2) \quad (7)$$

It should be noted that the video signal processor 10 may adopt a maximum function or mean function in place of the minimum function given by the expression (7) as necessary.

Figure 11:
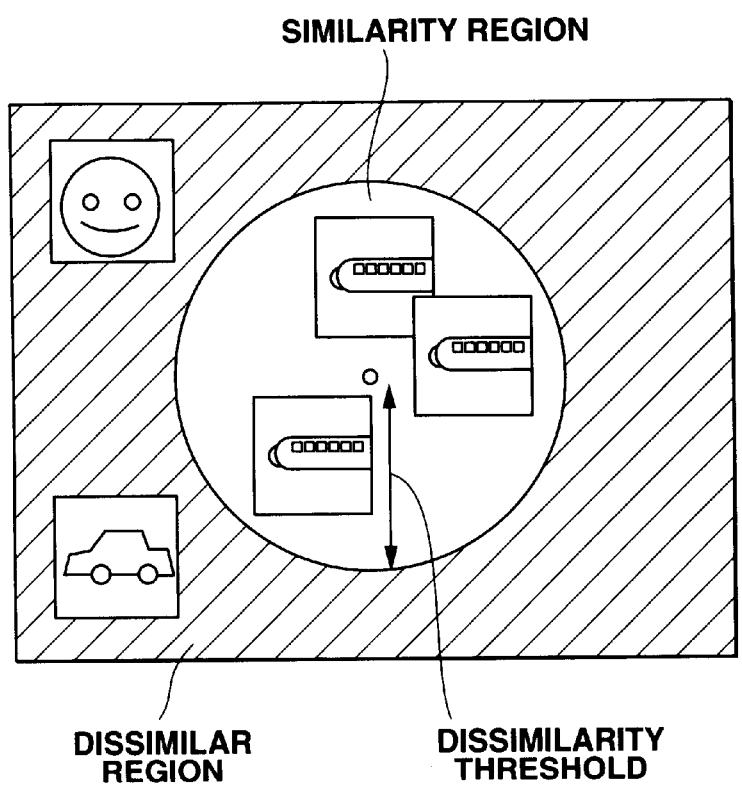
FIG. 11 explains the dissimilarity threshold.

Note that if not restricted in any way, the hierarchical clustering method will put all segments included in video data into a single group. To avoid this, the video signal processor 10 is adapted to judge whether two segments are similar to each other by comparing each of them with a dissimilarity threshold $\delta_{sim}$ as shown in FIG. 11. The dissimilarity threshold $\delta_{sim}$ is a threshold for determining whether two segments belong to the same chain. The video signal processor 10 groups segments into clusters so that the dissimilarity of all cluster pairs will not be beyond the dissimilarity threshold $\delta_{sim}$.

Note that with the video signal processor 10, the dissimilarity threshold $\delta_{sim}$ may be set by the user or automatically. However, when a fixed value is used as the dissimilarity threshold $\delta_{sim}$, its maximum value will depend upon the content of a video data. For a video data having a large variety, for example, the dissimilarity threshold $\delta_{sim}$ has to be set to a high level. On the contrary, for a video data having less variety, the dissimilarity threshold $\delta_{sim}$ has to be set to a low level. Generally, when the dissimilarity threshold $\delta_{sim}$ is at a high level, a decreased number of clusters will be detected. When the threshold $\delta_{sim}$ is at a low level, an increased number of clusters will be detected.

Thus, it is important to set an appropriate dissimilarity threshold $\delta_{sim}$ for the video signal processor 10 since the performance of the processor 10 depends greatly on the set dissimilarity threshold. Therefore, when setting a dissimilarity threshold $\delta_{sim}$ for the video signal processor 10, the user has to take the above in consideration. On the other hand, the video signal processor 10 can automatically determine an effective dissimilarity threshold $\delta_{sim}$ by the method which will be described below.

A typical one of the methods will be described. The video signal processor 10 detects a dissimilarity threshold $\delta_{sim}$ using a statistic value such as a mean value and median of the dissimilarity distribution between (n)(n−1)/2 segment pairs. On the assumption that the mean value and standard deviation of the dissimilarity of all segments are $\mu$ and $\sigma$, respectively, the dissimilarity threshold $\delta_{sim}$ can be given by $a\mu+b\sigma$ where a and b are constants. It was found through our many experiences that setting of the constants a and b to 0.5 and 0.1 can provide a good result.

Practically, the video signal processor 10 has not to determine any dissimilarity between all segment pairs but has only to acquire at random from a set of all segment pairs segment pairs whose mean value $\mu$ and standard deviation a are approximately real values to determine a dissimilarity.

Using the mean value $\mu$ and standard deviation $\sigma$, the video signal processor 10 can automatically acquire an appropriate dissimilarity threshold $\delta_{sim}$. That is, when the total number of segment pairs is n and an arbitrary small constant is C, the video signal processor 10 will extract a dissimilarity between a number, given by Cn, of segment pairs, for thereby automatically determining an appropriate dissimilarity threshold $\delta_{sim}$.

After clustering the segments as in the above, the video signal processor 10 rearranges the segments included in each cluster to automatically acquire initial candidates for the basic similarity chain.

Note that many of the chain candidates detected at step S11 in FIG. 10 are irrelevant to any actual video structure. Thus, the video signal processor 10 has to determine which of the chain candidates forms an important framework of a video structure or is relevant to the video structure. To this end, the video signal processor 10 filters, at step S12, the chains using a quality determination criterion corresponding to a numerical reference indicating the quality of the chains. That is, the video signal processor 10 determines the importance and relevance of the chain candidates in the video structure analysis and provides only chain candidates whose quality is higher than a predetermined quality determination criterion threshold as a result of the chain detection. The most simple example as a relevance determination function used in filtering is a Boolean function which indicates whether the chain candidate is acceptable or not. Note however that the video signal processor 10 may adopt a more complicated relevance determination function.

In the video signal processor 10, length, density, strength, etc. of the chain are used as chain quality determination criteria.

First, the chain length is defined as a number of segments included in one chain. Generally, when the chain length is short, it can be used as a chain quality determination criterion in the video signal processor 10, which however depends upon whether the chain can be regarded as an ordinary noise. For example, when a certain chain has only a single segment, it will not have any information. That is, the chain length-based quality determination criterion can be used only when the chain includes a minimum permissible number of segments.

Next, the chain density is defined as a ratio between a total number of segments included in a certain chain and that of segments included in a part of a video data that the chain occupies. This is because chains should preferably be concentrated in a limited time area as the case may be. In this case, the video signal processor 10 should use the chain density as the chain quality determination criterion.

Finally, the chain strength is an index indicative of how similar segments in a chain are to each other. The more similar the segments are to each other, the higher strength the chain has. Note that the video signal processor 10 may adopt many methods for determination of the chain strength, such as an intra-chain similarity determination method, a method for averaging the dissimilarity between all possible segment pairs, and a method of taking a maximum value of the dissimilarity between all possible segment pairs.

The chain strength measurement by the video signal processor 10 using the intra-chain similarity determination method will be described herebelow as one example. The intra-chain similarity determination method is to provide a similarity between segments included in a chain as a mean value of the dissimilarity between most typical segments included in the chain. The typical segments include a chain-centroid segment $S_{centroid}$ defined as given by the following expression (8):

$$S_{centroid} = \frac{arg\ min}{S_A \in C} \frac{1}{|C|} \sum_{S_B \in C} d_F(S_A, S_B) \quad (8)$$

where argmin in the above expression indicates that an input $S_A \in C$ whose evaluated value is minimum is acquired.

Thus, a chain strength $d_{centroid}$ is given by the expression (9):

$$d_{dentroid} = \frac{1}{|C|} \sum_{S \in C} d_F(S, S_{centroid}) \quad (9)$$

Figure 12:
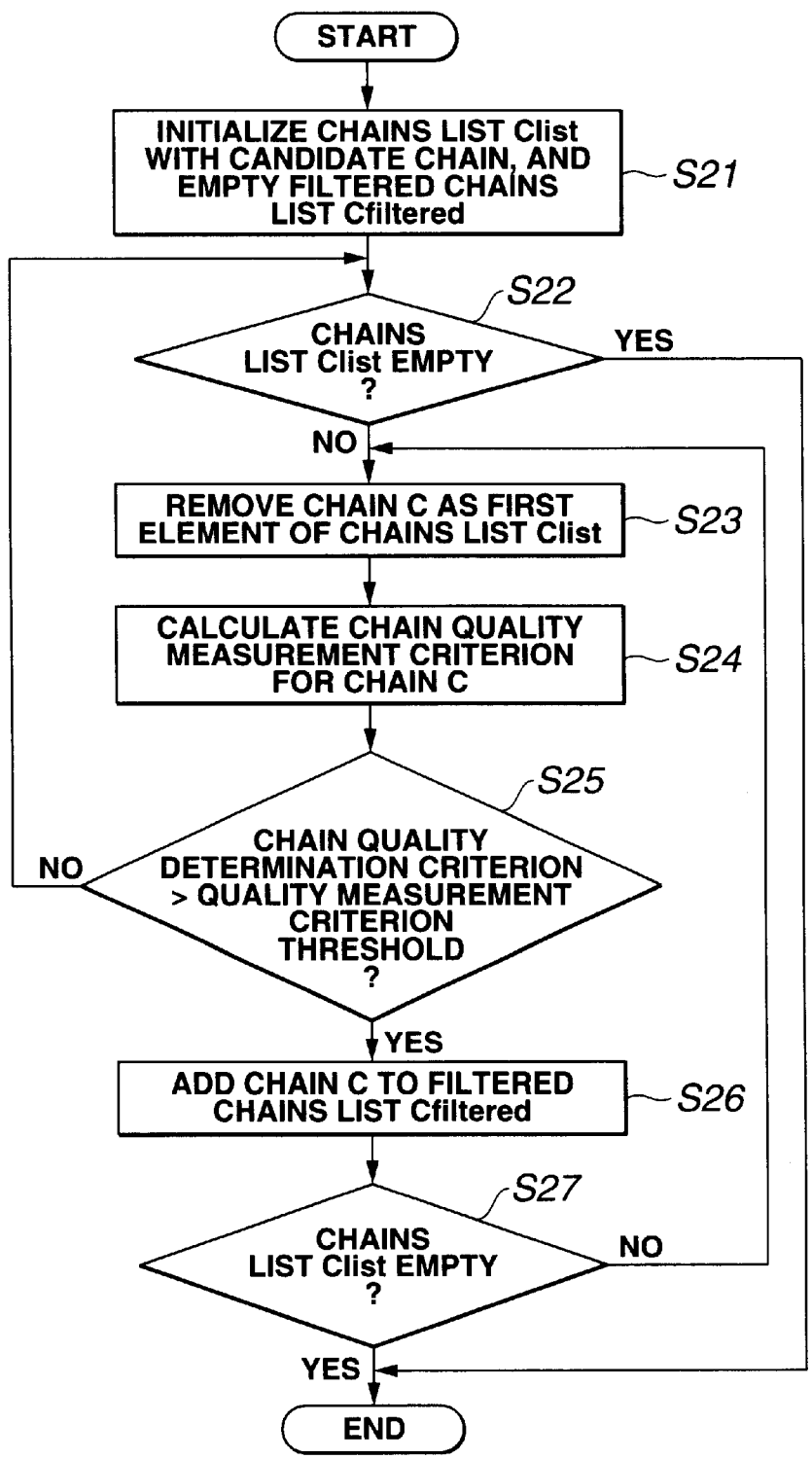
FIG. 12 is a flow chart of a series of operations effected in filtering the basic similarity chain in the video signal processor.

Using the above-mentioned chain quality determination criterion, the video signal processor 10 filter a chain by a series of operations shown in FIG. 12.

First at step S21, the video signal processor 10 initializes a chains list $C_{list}$ with candidate chains while emptying a filtering chains list $C_{filtered}$.

Next at step S22, the video signal processor 10 judges whether the chains list $C_{list}$ is empty or not.

When the chains list $C_{list}$ is empty, the video signal processor 10 will terminate the series of operations since there is no candidate chain.

On the contrary, when the chains list $C_{list}$ is no empty, the video signal processor 10 will remove, at step S23, a certain chain C from the chains list $C_{list}$ taking the chain C as a first element in the chains list $C_{list}$.

Then at step S24, the video signal processor 10 calculates a chain quality determination criterion for the chain C.

At step S25, the video signal processor 10 will judge whether the chain quality determination criterion is larger than the quality determination criterion threshold.

When the chain quality determination criterion is smaller than the quality determination criterion threshold, the video signal processor 10 goes to step S22 where it will effect operation for another chain.

On the contrary, when the chain quality determination criterion is larger than the quality determination criterion threshold, the video signal processor 10 will add the chain C to the filtering chains list $C_{filtered}$ at step S26.

Then the video signal processor 10 will judge, at step S27, whether the chains list $C_{list}$ is empty or not.

When the chains list $C_{list}$ is determined to be empty, the video signal processor 10 will terminate the series of operations since there is no candidate chain.

On the contrary, when the chains list $C_{list}$ is not empty, the video signal processor 10 will go to step S23. Thus, the video signal processor 10 will repeatedly effect the operations until the chains list $C_{list}$ becomes empty.

With the above-mentioned series of operations, the video signal processor 10 can filter the chains to determine which of the chain candidates forms an important framework of a video structure or is relevant to the video structure.

As in the above, the video signal processor 10 can detect a basic similarity chain using the batch clustering technique.

The video signal processor 10 can detect a basic similarity chain using the aforementioned consecutive clustering technique in stead of the batch clustering technique. That is, the video signal processor 10 processes segments in a video data one by one in their supplied order to repeatedly list candidate chains and update the chains list. Also in this case, the video signal processor 10 effects the main process of chain detection in two steps as in the batch clustering. Namely, first the video signal processor 10 will use the consecutive clustering algorithm to detect clusters including similar clusters. Next, the video signal processor 10 will use a similar chain quality determination criterion to that in the batch clustering technique to filter the detected clusters. Namely, the consecutive clustering technique used in the video signal processor 10 is different from the batch clustering technique in that the chain filtering is effected at an earlier time.

In the consecutive clustering technique, the consecutive clustering technique algorithm is used for cluster the segments. Generally, most of the consecutive clustering methods are effected locally optimally. More specifically, the consecutive clustering algorithm is such that each time a new segment is supplied, it is judged whether the segment is assigned to an existing cluster or a new cluster including the segment is to be generated. On the other hand, more elaborate consecutive clustering algorithms include a one in which to prevent a bias effect incidental to the input order of segments, the cluster division itself is updated each time a new segment is supplied. Such an algorithm is known from "J. Roure and L. Talavera: Robust Incremental Clustering with Bad Instance Orderings: A new Strategy, Proceedings of the Sixth Iberoamerican Conference on Artificial Intelligence, IBERAMIA-98. Pages 136–147. Lisbon, Portugal. Helder Coelho ed., LNAI vol. 1484. Springer Verlag, 1998".

Figure 13:
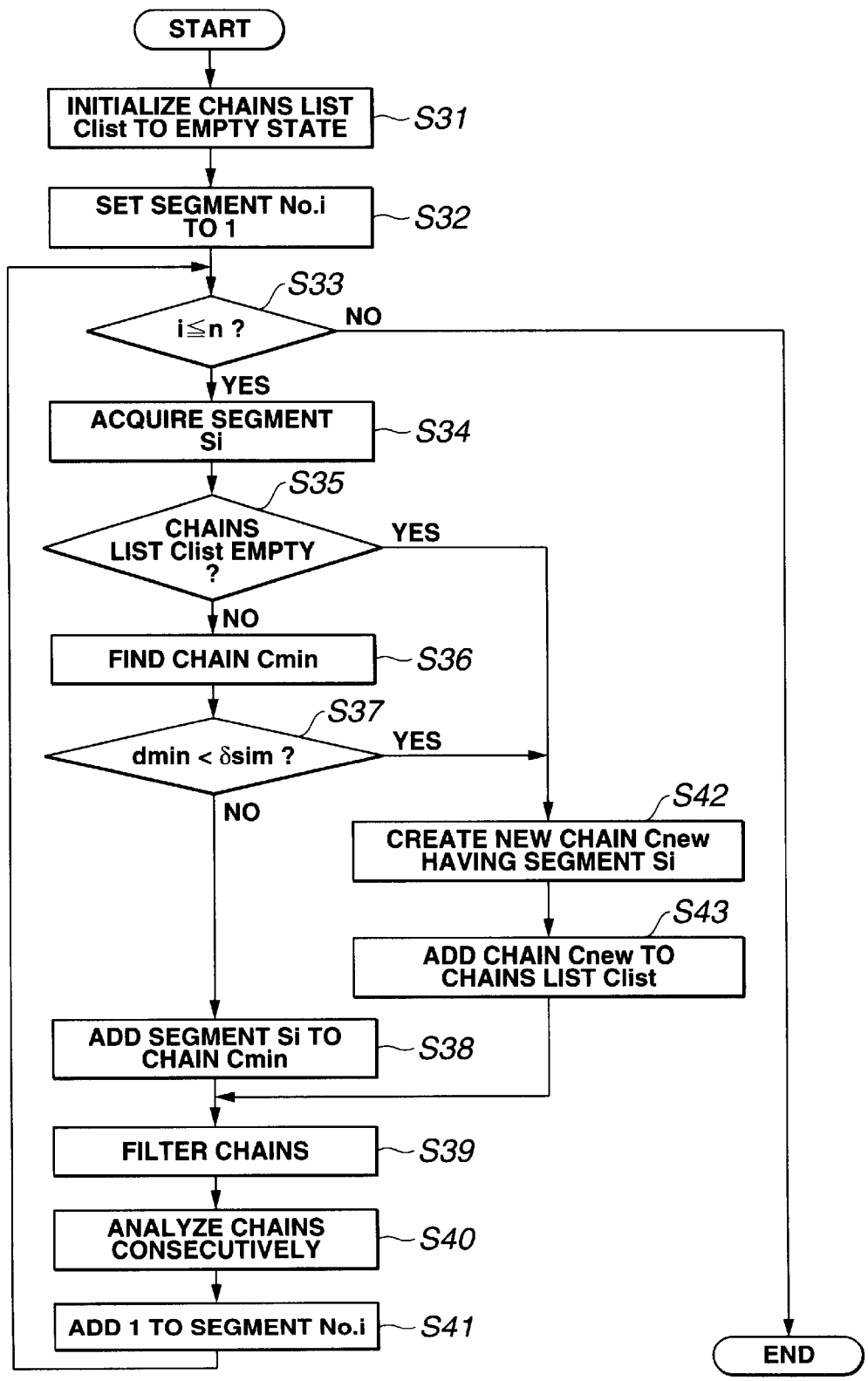
FIG. 13 is a flow chart of a series of operations effected in detecting a basic similarity chain using the consecutive clustering technique in the video signal processor.

The video signal processor 10 effects a series of operations as shown in FIG. 13 as one example of the consecutive clustering algorithm. It is assumed here that a video data is divided in segments $S_1, \ldots, S_n$. Note that the series of operations including the chain analysis step will be described herebelow.

First, as shown in FIG. 13, the video signal processor 10 initializes the chains list $C_{list}$ to an empty state at step S31 and sets the segment number i to 1 at step S32.

Next at step S33, the video signal processor 10 judges whether the segment number i is smaller or not than the total number n of segments.

Note that when the segment number i is larger then total number n of segments, the video signal processor 10 terminates the series of operations since there is no segment.

On the contrary, when the segment number i is smaller than the total number n of segments, the video signal processor 10 will acquire a segment $S_1$ at step S34, and judge at step S35 whether the chains list $C_{list}$ is empty or not.

When the chains list $C_{list}$ is empty, the video signal processor 10 goes to step S42.

On the contrary, when the chains list $C_{list}$ is not empty, the video signal processor 10 detects, at step S36, a chain $C_{min}$ whose dissimilarity to the segment $S_1$. The chain $C_{min}$ is defined as given by the expression (10):

$$C_{min} = \underset{C \in C_{list}}{\arg\min}\, d_{sc}(C, S_i) \qquad (10)$$

where $d_{SC}(C, S)$ is a criterion for determination of dissimilarity between the chain C and segment S, and it is given by the expression (11):

$$d_{sc}(C, S) = \underset{S_i \in C}{\min}\, d_F(S, S_i) \qquad (11)$$

The criterion dsc(C, S) is equal to the second argument in the expression (7) for the similarity determination criterion defined concerning the batch clustering technique, taken as a cluster including only the segment $S_1$. In the following description, the minimum dissimilarity $d_{SC}(C_{min}, S_i)$ between the chain $C_{min}$ and segment $S_i$ will be given by $d_{min}$.

Next at step S37, the video signal processor 10 uses the dissimilarity threshold $\delta_{sim}$ having been described concerning the batch clustering technique to determine whether the minimum dissimilarity $d_{min}$ is smaller than the dissimilarity threshold $\delta_{sim}$.

When the minimum dissimilarity $d_{min}$ is larger than the dissimilarity threshold $\delta_{sim}$, the video signal processor 10 goes to step S42 where it will generate a new chain $C_{new}$ including only the segment $S_i$ as the only element segment, and adds the new chain $C_{new}$ to the chains list $C_{list}$ at step S43. Then, it goes to step S39.

On the contrary, when the minimum dissimilarity $d_{min}$ is smaller than the dissimilarity threshold $\delta_{sim}$, the video signal processor 10 will add the segment $S_i$ to the chain $C_{min}$ at step S38. Namely, the video signal processor 10 will provide $C_{min} \leftarrow C_{min} \cup S_i$.

Then at step S39, the video signal processor 10 filter the chains. That is, the video signal processor 10 determines the quality of the chain C for each element chain $C \in C_{list}$ as mentioned above to acquire only chains whose quality determination criterion is larger than the quality determination criterion threshold, and adds the acquired chains to the filtering chains list $C_{filtered}$.

Further at step S40, the video signal processor 10 will consecutively analyze the chains. That is, the video signal processor 10 passes to the analysis module the chains list $C_{filtered}$ having been filtered at that time.

Then, the video signal processor 10 adds 1 to the segment number i at step S41, and goes to step S33.

In this way, the video signal processor 10 will repeat the above-mentioned series of operations until the segment number i becomes larger than the total number n of segments. Then, the video signal processor 10 will detect as the basic similarity chain each element chain of the chains list $C_{list}$ when the segment number i has become the total number n of segments.

Note that the series of operations shown on FIG. 13 is based on the assumption that the total number n of segments included in an input video data is already known. Generally, however, the total number n of segments is not given in advance in many cases. In this case, the consecutive clustering algorithm should be used to judge at step S33 in FIG. 13 whether the series of operations is to be continued or ended depending upon whether further segments are supplied or not.

With the series of operations, the video signal processor 10 can detect a basic similarity chain using the consecutive clustering technique.

Figure 14:
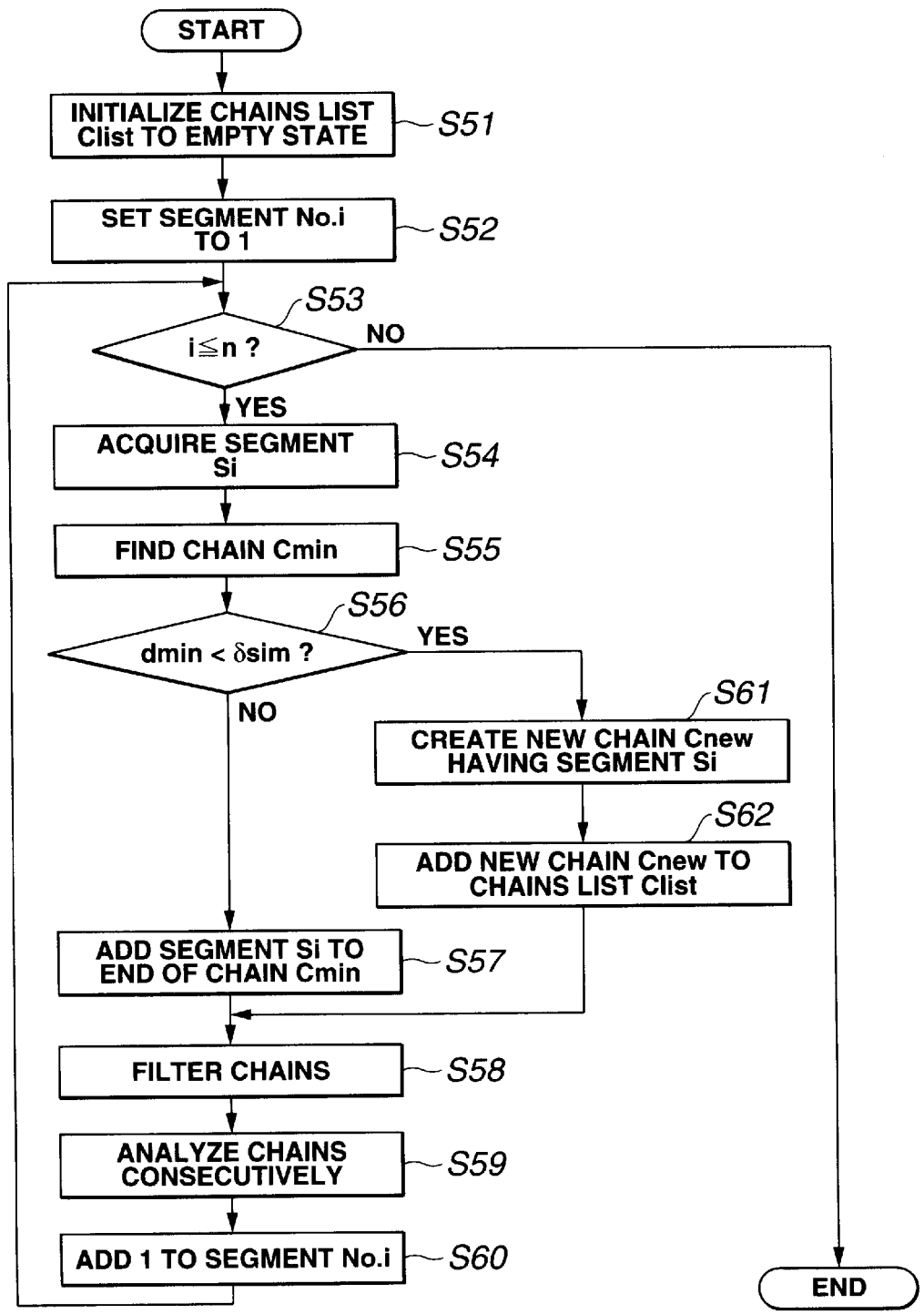
FIG. 14 is a flow chart of a series of operations effected in detecting a linked similarity chain in the video signal processor.

Next, detection of the aforementioned linked similarity chains will be described. The detection of linked similarity chains by the video signal processor 10 can be regarded as a special case of basic similarity chain detection. The video signal processor 10 effects the operations as shown in FIG. 14 to detect linked similarity chains using the consecutive clustering algorithm. It is assumed herein that a video data includes divided segments $S_1, \ldots, S_n$. Note that a series of operations including the chain analysis step will be described.

First, as shown in FIG. 14, the video signal processor 10 initializes the chains list $C_{list}$ to an empty state at step S51 and sets the segment number i to 1 at step S52.

Next at step S53, the video signal processor 10 judges whether the segment number i is smaller or not than the total number n of segments.

Note that when the segment number i is larger then total number n of segments, the video signal processor 10 terminates the series of operations since there is no segment.

On the contrary, when the segment number i is smaller than the total number n of segments, the video signal processor 10 will acquire a segment $S_i$ at step S54, and acquire at step S55 a chain $C_{min}$ whose dissimilarity to the segment $S_1$ is minimum. The chain $C_{min}$ is defined as given by the expression (12):

$$C_{min} = \underset{C \in C_{list}}{arg\ min}\, d_{sc}(C, S_i) \quad (12)$$

where $d_{SC}(C, S)$ is a criterion for determination of dissimilarity between the chain C and segment S, and it is given by the expression (13):

$$d_{sc} = (C, S) d_F(S_{|C|}, S_i) \quad (13)$$

That is, different from the above expression (11) being the dissimilarity determination criterion used in the detection of basic similarity chains, the dissimilarity determination criterion $d_{SC}(C, S)$ is given as a dissimilarity between the object segments and the last element segment in the chain C.

Next at step S56, the video signal processor 10 uses the aforementioned dissimilarity threshold $\delta_{sim}$ to determine whether the minimum dissimilarity $d_{min}$ is smaller than the dissimilarity threshold $\delta_{sim}$.

When the minimum dissimilarity $d_{min}$ is larger than the dissimilarity threshold $\delta_{sim}$, the video signal processor 10 goes to step S61 where it will generate a new chain $C_{new}$ including only the segment $S_i$ as the only element segment, and adds the new chain $C_{new}$ to the chains list $C_{list}$ at step S62. Then, it goes to step S58.

On the contrary, when the minimum dissimilarity $d_{min}$ is smaller than the dissimilarity threshold $\delta_{sim}$, the video signal processor 10 will add the segment $S_i$ to the chain $C_{min}$ at step S57. Namely, the video signal processor 10 will provide $C_{min} \leftarrow C_{min}, S_i$.

Then at step S58, the video signal processor 10 filter the chains. That is, the video signal processor 10 determines the quality of the chain C for each element chain $C \in C_{list}$ as mentioned above to acquire only chains whose quality determination criterion is larger than the quality determination criterion threshold, and adds the acquired chains to the filtering chains list $C_{filtered}$. Note that the video signal processor 10 may not effect this step.

Further at step S59, the video signal processor 10 will consecutively analyze the chains. That is, the video signal processor 10 passes to the analysis module the chains list $C_{filtered}$ having been filtered at that time.

Then, the video signal processor 10 adds 1 to the segment number i at step S60, and goes to step S53.

In this way, the video signal processor 10 will repeat the above-mentioned series of operations until the segment number i becomes larger than the total number n of segments. Then, the video signal processor 10 will detect as the linked similarity chain each element chain of the chains list $C_{list}$ when the segment number i has become the total number n of segments.

With the above-mentioned series of operations, the video signal processor 10 can detect linked similarity chains using the consecutive clustering technique.

It should be noted that the series of operations shown on FIG. 14 is based on the assumption that the total number n of segments included in an input video data is already known. Generally, however, the total number n of segments is not given in advance in many cases. In this case, the consecutive clustering algorithm should be used to judge at step S53 in FIG. 14 whether the series of operations is to be continued or ended depending upon whether further segments are supplied or not.

Next, detection of the aforementioned cyclic chains will be described herebelow. The cyclic chain $C_{cylic}$ can be regarded as a set of k different basic similarity chains or linked similarity chains $\{C_1, \ldots, C_k\}$. In the following description, the segments in the cyclic chain $C_{cyclic}$ will be referred to with references $S_1, \ldots, S_n$ and $C(S_i)$ will indicate numbers 1, . . . , k for the chains in which the segment $S_i$ appears. Thus, when $C_{cyclic}$ is a cyclic chain, a list of chain numbers in series as $C(S_1), C(S_2), \ldots, C(S_n)$ will be described in the form of $i_1, \ldots, i_k, i_1, \ldots, i_k, \ldots, i_1, \ldots, i_k$. Of these cycles, one of $i_1, \ldots, i_k$ is a sequence of chain numbers 1, . . . , k, in other words, an arbitrary list including no overlapping chains. Note that in the following description, a cyclic chain $i_1, i_1, \ldots, i_1$ including one segment in one cycle will be referred to as "basic cyclic chain" hereinafter.

Figure 15:
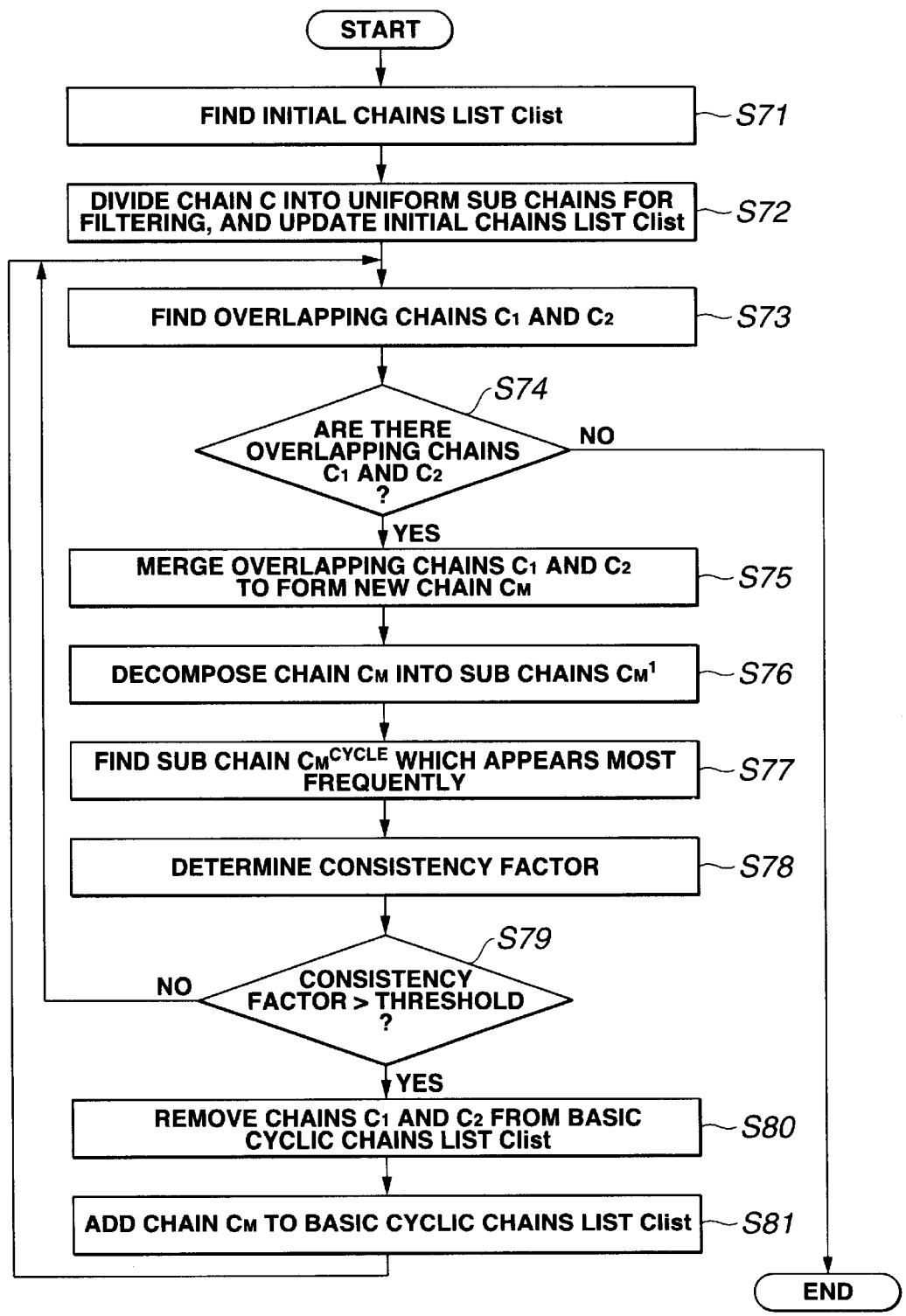
FIG. 15 is a flow chart of a series of operations effected in detecting a cyclic chain in the video signal processor.

Since in a cyclic structure of a video data, cycles are not completely coincident with each other but they are approximate to each other, the video signal processor 10 finds cyclic chains approximate to each other in the video data by a series of operations shown in FIG. 15. In the video signal processor 10, a restrictive condition can be added that an original basic cyclic chain should be uniform as necessary. Operations to be effected under the restrictive condition will be discussed herebelow.

First at steps S71 and S72 in FIG. 15, the video signal processor 10 detects basic cyclic chains included in a video data, generates an initial chains list based on the result of detection, and updates the initial chains list for all the basic cyclic chains included in the initial chains list to meet the above restrictive condition.

That is, the video signal processor 10 detects an initial chains list $C_{list}$ using an algorithm for detection of the above-mentioned basic similarity chains or linked similarity chains at step S71.

Then the video signal processor 10 confirms the uniformity of the chain C included in the initial chains list at step S72. When the chain C is not uniform, the video signal processor 10 divides the chain C into a plurality of sub chains so that the time intervals between the sub chains will be maximum. Next, the video signal processor 10 filters the sub chains thus acquired using the chain quality determination criterion having been described concerning the algorithm for detection of the basic similarity chains or linked similarity chains, and adds the acquired uniform sub chains to the initial chains list $C_{list}$.

Further, at step S73, the video signal processor 10 detects, from the chains list $C_{list}$, a pair of temporally overlapping chains $C_1$ and $C_2$ of $\exists C_1, C_2 | [C_1^{start}, C_1^{end}] \cap [C_2^{start}, C_2^{end}]$.

At step S74, the video signal processor 10 judges whether such overlapping chains $C_1$ and $C_2$ exist or not.

When there are no overlapping chains $C_1$ and $C_2$, the video signal processor 10 terminate the series of operations by taking that the chains list $C_{list}$ already includes a plurality of cyclic chains.

On the contrary, when there exist overlapping chains $C_1$ and $C_2$, the video signal processor 10 will evaluate, at steps S75 to S78, the consistency between cycles in a set of the two chains $C_1$ and $C_2$ to determine whether the two chains $C_1$ and $C_2$ form together one cyclic chain.

That is, at step S75, the video signal processor 10 puts the two chains $C_1$ and $C_2$ together to form a new cyclic chain $C_M$. Note that segments included in the new chain $C_M$ will be indicated with references $S_1, S_2, \ldots, S_{|C_M|}$.

Next, at step S76, the video signal processor 10 will take the chain number $C(S_1)$ in which the segment $S_1$ appears as C and decompose the chain $C_M$ into sub chains $C_M^1$, $C_M^2, \ldots, C_m^k$ at each appearance of C in the lists of chain numbers $C(S_1), C(S_2), \ldots, C(S_{|CM|})$, that is to say, just before there appears a segment belonging to a chain to which the segment $S_1$ belongs also. As a result, the video signal processor 10 will provide a list of sub chains as given by the expression (14):

$$C_M^k = S_{i_{k-1}+1}, \ldots, S_{i_k},$$  (14)

$$C_M^2 = S_{i_1+1}, \ldots, S_{i_2},$$

$$C_M^1 = S_1, \ldots, S_i,$$

As will be seen from the above, $C(S_{ij+1}) = C(S_1)$ is valid for all $C_M^j$ based on the expression (14).

Next at step S77, the video signal processor 10 finds a sub chain $C_M^{cycle}$ which appears most frequently. That is, the video signal processor 10 will effect an operation as given by the expression (15):

$$C_M^{cycle} = \underset{C_M^k}{\arg\max} |\{C_M^i \mid C_M^i = C_M^k, i \in \{1, \ldots, k\}\}|$$  (15)

The video signal processor 10 evaluates, at step S78, whether the sub chain $C_M^{cycle}$ appearing most frequently can be the first cycle of the original chain $C_M$ or not. That is, the video signal processor 10 defines a consistency factor mesh by a ratio of the appearance frequency of $C_M^{cycle}$ acquired at step S76 with the total number of sub chains, and judges, at step S79, whether the consistency factor exceeds a predetermined threshold or not, as given by the expression (16).

$$mesh = \frac{|\{C_M^i \mid C_M^i = C_M^{cycle}, i \in \{1, \ldots, k\}\}|}{k}$$  (16)

When the consistency factor does not exceed the threshold, the video signal processor 10 will go to step S73 where it repeats the similar operations for detection of other overlapping chains.

On the contrary, when the consistency factor exceeds the threshold, the video signal processor 10 removes, at step S80, the chains $C_1$ and $C_2$ from the chains list $C_{list}$, adds the chain $C_M$ to the chains list $C_{list}$ at step S81, and then goes to step S73.

The video signal processor 10 repeats the series of operations for all the cyclic chains included in the chains list $C_{list}$ until there exist no further overlapping chains, to thereby acquire the chains list $C_{list}$ including the last cyclic chain.

As in the above, the video signal processor 10 can detect various kinds of changes of similar segments based on the dissimilarity determination criterion and extracted feature.

Next, the chain analysis at step S5 in FIG. 5 will be described below. The video signal processor 10 uses detected chains to determine and output an output a local video structure and/or global video structure of the video data. How the result of chain analysis is used to detect a basic structure pattern taking place in a video data will be described in detail.

First, a scene being a local structure pattern taking place in a video data will be discussed.

The scene is the unit of most basic local video structures positioned at a high level than the segments having previously been described, and it is composed of a series of segments which are semantically connected to each other. The video signal processor 10 can detect such scenes using the chains. The requirement for the chains to comply with in the scene detection in the video signal processor 10 is that the time interval between successive segments does not exceed a predetermined value called "time threshold". The chains complying with the requirement will be referred to as "local chain" herein.

Figure 16:
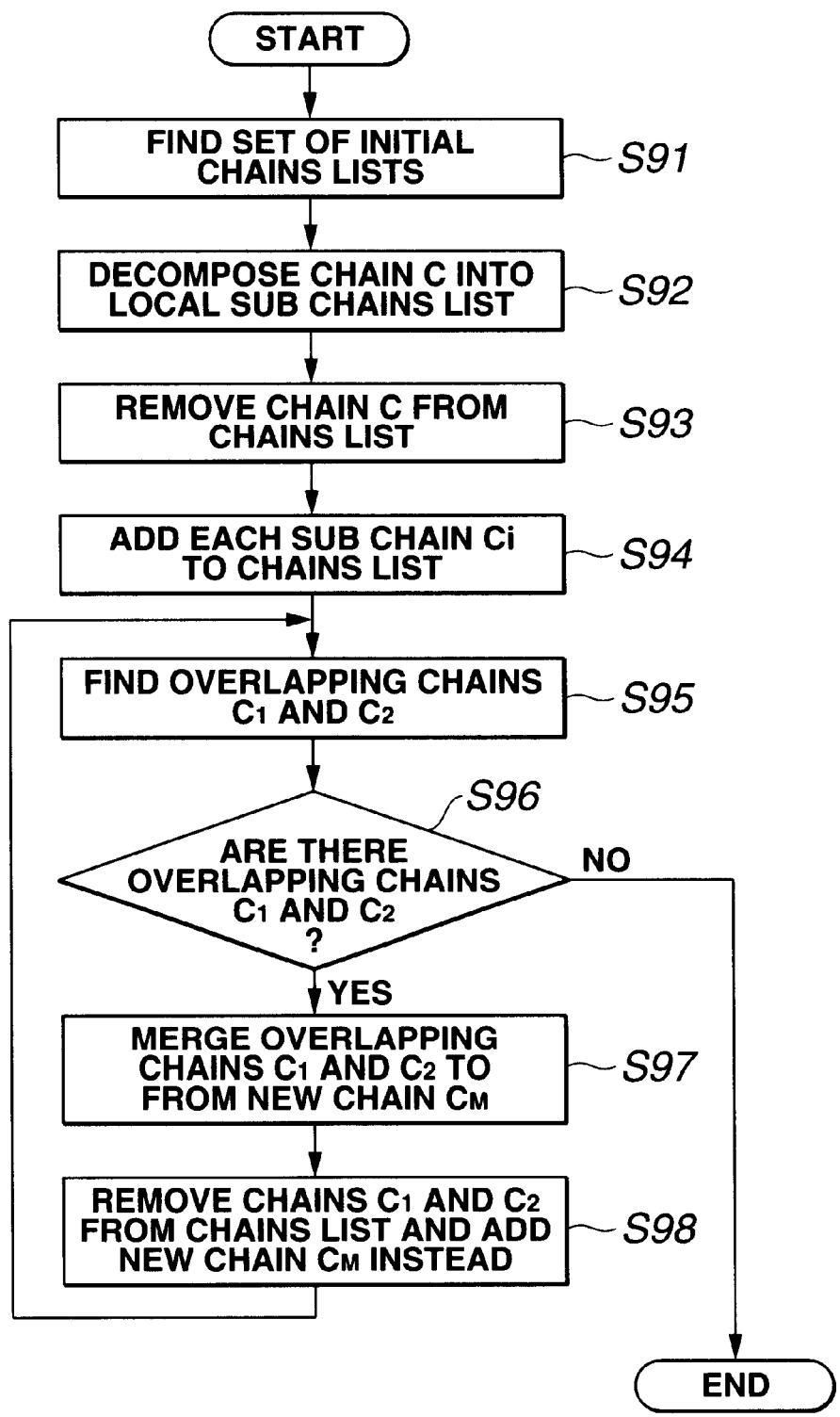
FIG. 16 is a flow chart of a series of operations effected in detecting a scene using the similarity chain in the video signal processor.

The video signal processor 10 effects a series of operations as shown in FIG. 16 to detect scenes using the chains.

First at steps S91 to S94 in FIG. 16, the video signal processor 10 acquire a local chains list.

More specifically, the video signal processor 10 detects, at step S91, a set of initial chains lists using the above-mentioned basic similarity chain detection algorithm.

Next at step S92, when each chain C in the detected initial chains list is not any local chain, the video signal processor 10 decomposes the chain C into local sub chains $C=C_1, \ldots, C_n$ being the longest within the requirement for the local chains.

Thereafter, the video signal processor 10 removes the chains C from the chains list at step S93.

Further, the video signal processor 10 adds the sub chains $C_i$ to the chains list at step S94. Upon completion of this operation, all the chains become local ones.

Next at step S95, the video signal processor 10 detects a pair of temporally overlapping chains $C_1$ and $C_2$ of $\exists C_1$, $C_2[C_1^{start}, C_1^{end}] \cap [C_2^{start}, C_2^{end}]$ from the chains.

Next at step S96, the video signal processor 10 judges whether there exist such temporally overlapping chains $C_1$ and $C_2$.

When there exist no temporally overlapping chains $C_1$ and $C_2$, the video signal processor 10 takes it that there exists one scene in each chain included in the chains list and terminates the series of operations.

On the contrary, when there exist the temporally overlapping chains $C_1$ and $C_2$, the video signal processor 10 puts, at step S97, the temporally overlapping chains $C_1$ and $C_2$ together to form a new chain $C_M$.

Further at step S98, the video signal processor 10 removes the temporally overlapping chains $C_1$ and $C_2$ from the chains list, adds the chain $C_M$ to the chains list, and then goes to step S95 where it will repeat the similar operations.

When no further overlapping chains exist in the chains list as a result, one scene will exist for each chain included in the finally acquired chains list. Note that the boundaries between scenes $C_j$ corresponding to the chain $C_j$ are given by $C^{start}$ and $C^{end}$.

Some of the segments remain not assigned to any chain, but the video signal processor 10 will put together such segments remaining between two detected chains to form one scene.

With the above-mentioned series of operations, the video signal processor 10 can detect a scene being a local structure pattern in a video data using the chains.

The application of such operations to a dialogue scene as shown in FIG. 2 will be considered below. In this case, the video signal processor 10 acquires a local chain of the segments of the talker at steps S91 to S94. At step S97, the video signal processor 10 will put these scenes together to form a single large scene indicative of the entire scene.

Thus, the video signal processor 10 can detect a dialogue scene.

Note that when the video signal processor 10 detects a scene, all segments in the scene are not covered by the chains.

Also, the video signal processor 10 can detect scenes consecutively by effecting the above-mentioned algorithm consecutively.

Next, detection of a news item as a global structure pattern will be described herebelow.

As having previously been described, a news program has such a cyclic structure that each news item begins with an introductory statement by an anchor, for example, and is followed by reports from more than one sites. That is, such a video structure can be regarded as a simple cyclic structure in which a time from an anchor shot until a next anchor shot is taken as one cycle.

Figure 17:
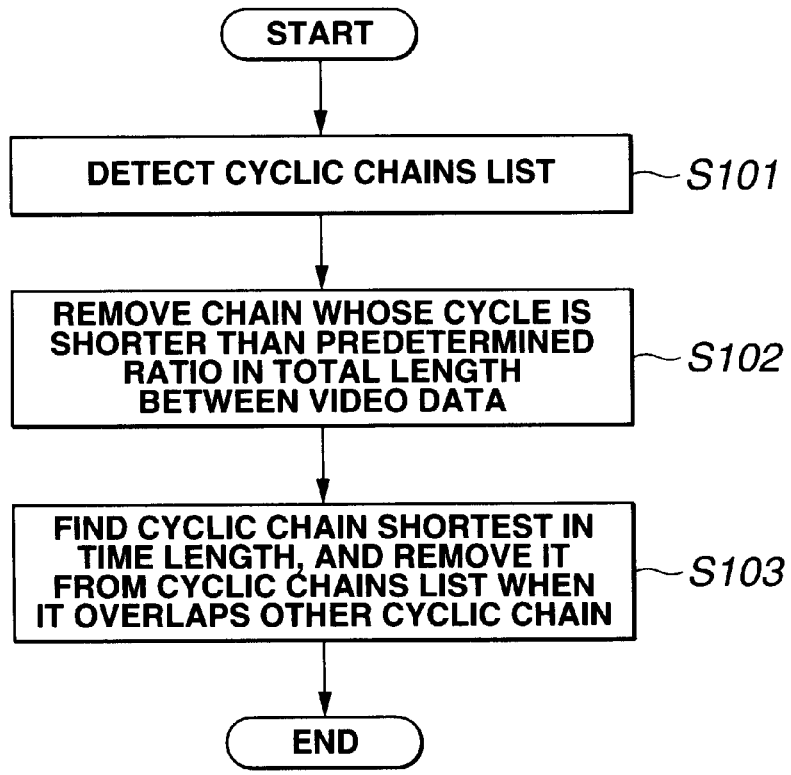
FIG. 17 is a flow chart of a series of operations effected in detecting a news item using the similarity chain in the video signal processor.

For automatic detection of a news item using a chain, the video signal processor 10 effects a series of operations as shown in FIG. 17.

First at step S101 in FIG. 17, the video signal processor 10 uses the aforementioned cyclic chain detection algorithm to detect cyclic chains. With this operation, the video signal processor 10 can acquire a list of cyclic chains. In the cyclic chains list, each cycle may represent a news item or not.

Next at step S102, the video signal processor 10 removes all cyclic chains whole cycles are shorter than a predetermined total length ratio of video data. More particularly, with this operation, the video signal processor 10 excludes a cyclic chain whose cycle is too short to be expectable to represent any news item. Such a cycle can take place for example when an emcee has an interview of a guest or when any other short time cycle takes place in a newscast.

At step S103, the video signal processor 10 selects a cyclic chain whose time duration is the shortest in all the cyclic chains remained not excluded at step S102. When the selected cyclic chain overlaps any other cyclic chain, the video signal processor 10 will remove that cyclic chain from the cyclic chains list. The video signal processor 10 will repeat this operation until any cyclic chain will not overlap any other cyclic chains. The list of cyclic chains left after completion of the operation at step S103 will include a detected news items list. That is, each cycle of the cyclic chains list acquired at step S103 represent one news item.

Thus, the video signal processor 10 can automatically detected news items using the chain.

Note that the video signal processor 10 can operate with no problem even with a shift of the new caster from one to another at changeover of news item from a main, sports to business segments for example in a newscast.

Next, detection of a play in a sportscast will be explained herebelow.

Many of sports video data are featured by a fixed pattern that a play is formed from the same series of steps repeated many times. In the baseball, for example, the play is formed basically by a pitcher throwing a ball and a batter trying to hit the ball. Other sports video data having such a play structure include video data of football, rugby and the like games.

When a video data having the above play structure is broadcast, it will represent a repeated group of segments of various parts of a play. That is, in the video data, segments representing a pitcher are followed by segments representing a butter. When a ball thrown by the pitcher is hit by the butter, the segments representing the butter are followed by segments representing outfielders. Thus, when the chain detection by the video signal processor 10 is applied to the baseball game broadcast, segments included in the video data of the baseball game and representing a pitcher are detected as one chain, segments representing a butter are detected as another chain, and segments representing the other outfielders and various other scenes are detected as other chains.

Namely, a play structure in the sportscast will be a cyclic image detectable using the aforementioned cyclic chain detecting method. Another example of such a play structure is a tennis game video data. The video data of tennis game is composed of cycles such as a serve, a volley, a serve and then a volley. In this case, since segments of each serve are similar to each other as images, the video signal processor 10 uses such segments to detect a play. Thus, in the video data structure analysis, the video signal processor 10 can detect an approximate game play structure.

Further, in a play structure of any other sports, especially, individual events, each player will effect an activity to the end and all players can be regarded as doing approximately same activity. In the ski jumping for example, one jumper tries one jump and then a next jumper tries one jump also. A video data of a ski jumping for broadcasting is generally composed of segments of a jumper's being ready for starting, skiing downhill on the approach, jumping and landing. Thus, the video data is a repetition of a series of segments for each jumper. When the chain detection is applied to such a video data for broadcasting, a series of chains similar to each other in each step of a jumping will be detected. Therefore, the cycle of each jumper can be extracted using the cycling chain detecting method.

In order for the video signal processor 10 to automatically detect a play in a sportscast using the chain detection method, a further restriction has to be set to exclude inappropriate chains. It depends upon the kind of a sports in consideration what restriction is appropriate for such a purpose. For example, the video signal processor 10 may use an empirical rule that of detected cyclic chains, only ones having long cycles are detected as plays.

Figure 18:
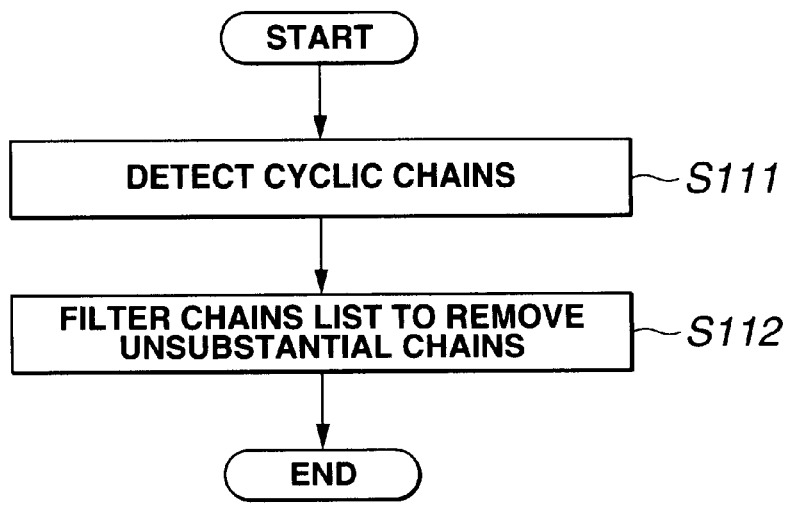
FIG. 18 is a flow chart of a series of operations effected in detecting a play in a sports program using the similarity chain in the video signal processor.

That is, the video signal processor 10 effects a series of operations as outlined in FIG. 18 to use the chain detection method for automatic detection of plays in a sportscast.

First at step S111, the video signal processor 10 detects cyclic chains using the aforementioned cyclic chain detection algorithm.

Then at step S112, the video signal processor 10 applies a quality criterion to the detected chains list to filter the chains list and remove unsubstantial chains from the list. The quality criterion is for example a cyclic chain covering the majority of a program. Namely, such a cyclic chain is kept while the other cyclic chains are excluded. Of course, the video signal processor 10 may additionally adopt a restrictive condition peculiar to each sports.

Thus, the video signal processor 10 can automatically detect a play in a sportscast by analyzing the chains.

Next, detection of a topics by a combination of the cyclic detection and scene detection will be described herebelow.

For example, each of video data of many TV programs such as drama, comedy, variety show, etc. is composed of the aforementioned scenes. However, the video data has a so-called "topic" structure as an upper structure. Some of the topic structures consist of a list of some relevant scenes. The topic is not always similar to topics in a newscast beginning with segments of an introduction by a studio emcee. For example, segments of a logo image or segments of a main emcee are used as visual examples in place of the introductory segments, and the same program music always broadcast at each start of a new topic is used as audio example.

It is possible to judge, by a combination of the cyclic detection and scene detection, whether or not a video data of a program has such a topic structure.

Figure 19:
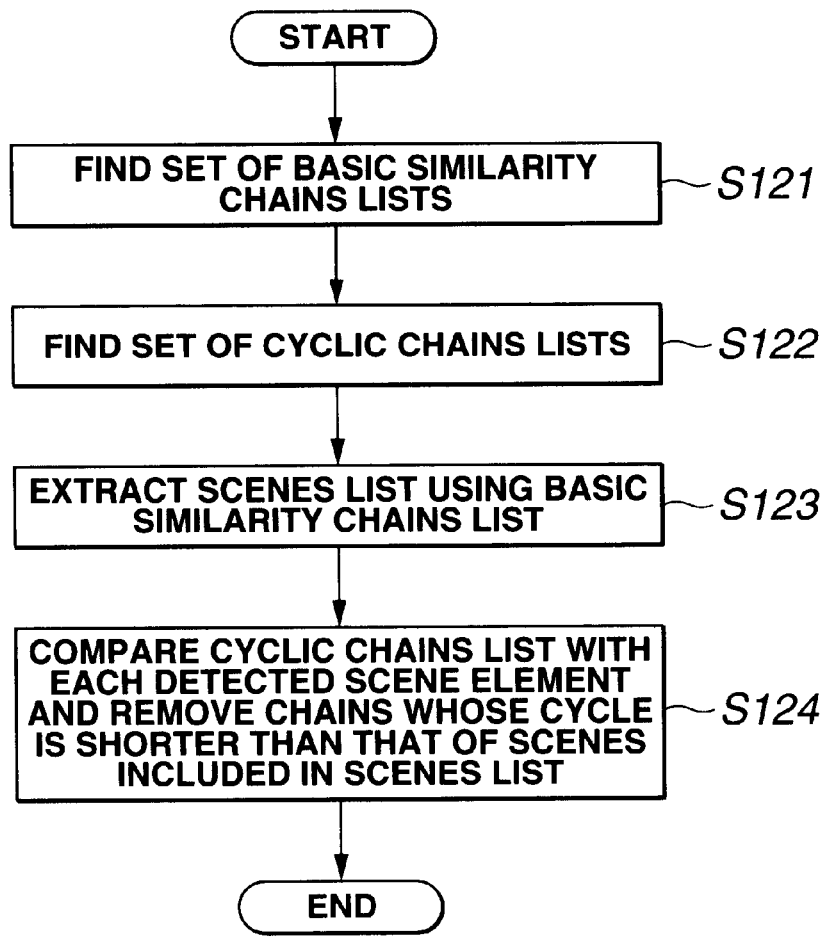
FIG. 19 is a flow chart of a series of operations effected in a topic detection in which a cyclic detection and scene detection are combined using the similarity chain, in the video signal processor.

To this end, the video signal processor 10 effects a series of operations as outlined in FIG. 19 to detect a topic by the combination of the cyclic detection using chains and the scene detection.

First at step S121 in FIG. 19, the video signal processor 10 detects basic similarity chains to discriminate a set of basic similarity chains from the other.

Next at step S122, the video signal processor 10 detects cyclic chains to discriminate a set of cyclic chains list from the other.

Then at step S123, the video signal processor 10 uses the basic similarity chains list detected at step S121 and applies the algorithm shown in FIG. 16 to extract scene structures. Thus, the video signal processor 10 can acquire a scenes list.

At step S124, the video signal processor 10 compares the cyclic chains list detected at step S122 with each scene element detected at step S123, and removes all shorter-cycle cyclic chains than the scenes included in the detected scenes list. The remaining cyclic chains have some scenes in each cycle thereof, but the cycle will be discriminated as a candidate topic.

Thus, the video signal processor 10 can detect topics by a combination of the cyclic detection using the chains and the scene detection.

Note that the video signal processor 10 can detect topics with a high accuracy by setting other restrictions and quality requirement for the operations at step S124.

As in the above, using the detected various chains, the video signal processor 10 can determine and output a variety of local video structures and/or global video structures.

As having been described in the foregoing, the video signal processor 10 according to the present invention can detect similarity chains composed of a plurality of visual or audio segments similar to each other. Then, the video signal processor 10 can analyze the detected similarity chains to extract high-level video structures. Especially, the video signal processor 10 can analyze the local and global video structures in a common framework.

The video signal processor 10 can full automatically effect the series of operations with no necessity for the user to know the structure of the video data content.

Also, using the consecutive chains, the video signal processor 10 can consecutively analyze the video structure. Further, if the platform used in the video signal processor 10 has a sufficiently high calculating capability, the video signal processor 10 can real-time analyze the video structure. Thus, the video signal processor 10 can be applied video data previously recorded and live video broadcast. For example, the video signal processor 10 is applicable to a live sportscast to detect plays in the sportscast.

Furthermore, the video signal processor 10 can provide a new high-level access base for video browsing as a result of the video structure detection. That is, the video signal processor 10 can access to a content-based video data using high-level video structures such as topics, not segments. For example, by displaying scenes, the video signal processor 10 can quickly know the summary of a program and rapidly detect an interesting part.

Moreover, using the result of topic detection from a newscast, the video signal processor 10 can provide a strong and new method of access to a newscast by permitting the user to select, watch and listen to a news in units of news item.

Also, the video signal processor 10 can provide a base for automatic summing-up of a video data as a result of the video structure detection. Generally, a consistent summary should be prepared not by combining significant segments included in a video data but by decomposing the video data into significant components which can be reconstructed and combining appropriate segments based on the components. Video structures detected by the video signal processor 10 will provide basic information for such summing-up.

Further, the video signal processor 10 can analyze a video data into genres. For example, the video signal processor 10 can be adapted to detect only games of tennis.

Thus, the video signal processor 10 can be incorporated in a video editing system in a broadcasting station to edit a video data based on its contents.

Moreover, the video signal processor 10 can be used as a home appliance to analyze data in a home video recorder and automatically extract video structures from such a data. Further, the video signal processor 10 can be used to sum up the contents of a video data and edit the video data based on its contents.

On the other hand, the video signal processor 10 can be used as a tool to complement the user's manual analysis of the contents of a video data. Among others, the video signal processor 10 can provide an easier navigation of contents, and video structure analysis, of a video data by imaging the result of chain detection.

Also, since the algorithm used is very simple and can be calculated highly efficiently, the video signal processor 10 can be applied to home electronic appliances such as set-top box, digital video recorder, home server, etc.

It should be noted that the present invention is not limited to the embodiment having been described in the foregoing, but the features used for inter-segment similarity determination and the content of video data to which the present invention is applicable, for example, may of course be other than those having been described and be appropriately modified without departing from the scope of the present invention defined later.

INDUSTRIAL APPLICABILITY

As having been described in detail in the foregoing, the present invention provides a signal processing method for detecting and analyzing a pattern reflecting the semantics of the content of a signal, the method including steps of extracting, from a segment consisting of a sequence of consecutive frames forming together the signal, at least one feature which characterizes the properties of the segment; calculating, using the extracted feature, a criterion for measurement of a similarity between a pair of segments for every extracted feature and measuring a similarity between a pair of segments according to the similarity measurement criterion; and detecting, using the feature and similarity determination criterion, a similarity chain consisting of two or more, similar to each other, of the segments.

Therefore, the signal processing method according to the present invention can detect basic structure patterns composed of similar segments in a signal and analyze how the structure patterns are combined together, thereby permitting to extract high-level structures.

Also the present invention provides a video signal processor for detecting and analyzing a visual and/or audio pattern reflecting the semantics of the content of a supplied video signal, the apparatus including means for extracting, from a visual and/or audio segment consisting of a sequence of consecutive visual and/or audio frames forming together the video signal, at least one feature which characterizes the properties of the visual and/or audio segment; means for calculating, using the extracted feature, a criterion for measurement of a similarity between a pair of visual segments and/or audio segments for every extracted feature and measuring a similarity between a pair of visual segments and/or audio segments according to the similarity measurement criterion; and means for detecting, using the feature and similarity determination criterion, a similarity chain consisting of two or more, similar to each other, of the visual and/or audio segments.

Therefore, the video signal processor according to the present invention can determine and output basic structure patterns each composed of similar visual and/or audio segments in a video signal and analyze how the structure patterns are combined together, thereby permitting to extract high-level video structures.

What is claimed is:

1. A signal processing method for detecting and analyzing a pattern reflecting the semantics of the content of a signal, the method comprising the steps of:

extracting, from a segment consisting of a sequence of consecutive frames forming together the signal, at least two features which characterize the properties of the segment;

calculating, using at least one extracted feature, a criterion for measurement of a similarity between a pair of segments for every extracted feature and measuring a similarity between a pair of segments according to the similarity measurement criterion; and detecting, using at least two of the features and the similarity determination criterion, a similarity chain consisting of two or more, similar to each other, of the segments;

whereby detecting a similarity chain includes calculating multiple similarity values for the pair of segments according to respective extracted features and calculating the value of a weighted combination of said similarity values.

2. The method as set forth in claim 1, further comprising a step of:

analyzing the similarity chains to determine and output local and/or global structures of the signal.

3. The method as set forth in claim 1, wherein the signal is at least one of video and audio signals included in a video data.

4. The method as set forth in claim 1, wherein there is a constrained relation between similar segments included in the similarity chain.

5. The method as set forth in claim 1, wherein the structure of the similarity chain is constrained.

6. The method as set forth in claim 4, wherein the similarity chain is a basic similarity chain in which all segments are similar to each other.

7. The method as set forth in claim 4, wherein the similarity chain is a linked similarity chain in which adjacent ones of all segments are similar to each other.

8. The method as set forth in claim 4, wherein the similarity chain is a cyclic chain in which each of the segments is similar to a one occurring a predetermined number of segments downstream thereof.

9. The method as set forth in claim 5, wherein the similarity chain is a local chain in which the time interval between each pair of adjacent ones of all segments is shorter than a predetermined time.

10. The method as set forth in claim 5, wherein the similarity chain is a uniform chain in which all segments appear at nearly equal time intervals.

11. The method as set forth in claim 6, wherein the detecting step further comprises:

a candidate chain detecting step at which segments similar to each other are detected using at least one feature and the determination criterion and they are put together to form candidate chains; and a filtering step at which a quality determination criterion is calculated which is a numerical reference for each of the candidate chains, the importance of the candidate chains in the signal structure pattern analysis and relevance between them are determined, and only candidate chains for which the quality determination criterion exceeds a predetermined quality determination criterion threshold are output.

12. The method as set forth in claim 2, wherein segments of the signal are processed one after another in a time sequence in which the segments are supplied.

13. The method as set forth in claim 12, wherein the detecting step further comprises:

a candidate chain detecting step at which at least one feature and the determination criterion for object segments are used to update the candidate chains including the object segments at a selected time; and a filtering step at which a quality determination criterion is calculated which is a numerical reference for each of the candidate chains, the importance of the candidate chains in the signal structure pattern analysis and relevance between them in the signal structure pattern analysis are determined, and only candidate chains are output for which the quality determination criterion exceeds a predetermined quality determination criterion threshold.

14. The method as set forth in claim 8, wherein the detecting step further comprises steps of:

detecting initial candidates for the cyclic chain;

detecting, from the initial candidates for the cyclic chain, temporally overlapping chains; and determining the consistency between the overlapping chains.

15. The method as set forth in claim 2, wherein at the analyzing step, the similarity chains are used to detect and output scenes each being a subset based on the semantics of segments as a local structure of the signal.

16. The method as set forth in claim 2, wherein at the analyzing step, the similarity chains are used to detect and output, as a global structure of the signal, a structure pattern in which segments similar to each other appear repeatedly.

17. The method as set forth in claim 16, wherein a news item in a news broadcast is detected and output as the structure pattern.

18. The method as set forth in claim 16, wherein a video structure of a sportscast in which a play appears repeatedly is detected and output as the structure pattern.

19. The method as set forth in claim 2, wherein at the analyzing step, the similarity chains are used to detect and output a topic structure composed of ones relevant to each other, of the scenes each being a subset based on the semantics of the segments.

20. A video signal processor for detecting and analyzing a visual and/or audio pattern reflecting the semantics of the content of a supplied video signal, the apparatus comprising:

means for extracting, from a visual and/or audio segment consisting of a sequence of consecutive visual and/or audio frames forming together the video signal, at least two features which characterize the properties of the visual and/or audio segment;

means for calculating, using at least one of the extracted features, a criterion for measurement of a similarity between a pair of visual segments and/or audio segments for every extracted feature and measuring a similarity between a pair of visual segments and/or audio segments according to the similarity measurement criterion; and means for detecting, using the feature at least two of the features and the similarity determination criterion, a similarity chain consisting of two or more, similar to each other, of the visual and/or audio segments;

whereby detecting a similarity chain includes calculating multiple similarity values for the pair of segments according to respective extracted features and calculating the value of a weighted combination of said similarity values.

21. The apparatus as set forth in claim 20, further comprising means for analyzing the similarity chains to determine and output local and/or global visual and/or audio structures of the video signal.

22. The apparatus as set forth in claim 20, wherein there is a constrained relation between similar visual and/or audio segments included in the similarity chain.

23. The apparatus as set forth in claim 20, wherein the structure of the similarity chain is constrained.

24. The apparatus as set forth in claim 22, wherein the similarity chain is a basic similarity chain in which all visual and/or audio segments are similar to each other.

25. The apparatus as set forth in claim 22, wherein the similarity chain is a linked similarity chain in which adjacent ones of all visual and/or audio segments are similar to each other.

26. The apparatus as set forth in claim 22, wherein the similarity chain is a cyclic chain in which each of the visual and/or segments is similar to a one occurring a predetermined number of visual and/or audio segments downstream thereof.

27. The apparatus as set forth in claim 23, wherein the similarity chain is a local chain in which the time interval between each pair of adjacent ones of all visual and/or audio segments is shorter than a predetermined time.

28. The apparatus as set forth in claim 23, wherein the similarity chain is a uniform chain in which all visual and/or audio segments appear at nearly equal time intervals.

29. The apparatus as set forth in claim 24, wherein the detecting means detects visual and/or segments similar to each other using at least one feature and the determination criterion and puts them together to form candidate chains, calculates a quality determination criterion which is a numerical reference for each of the candidate chains, determines the importance of the candidate chains in the signal structure pattern analysis and relevance between them, and outputs only candidate chains for which the quality determination criterion exceeds a predetermined quality determination criterion threshold.

30. The apparatus as set forth in claim 21, wherein visual and/or audio segments of the video signal are processed one after another in a time sequence in which the visual and/or audio segments are supplied.

31. The apparatus as set forth in claim 30, wherein the detecting means updates the candidate chains including the object segments at a selected time using at least one feature and the determination criterion for object segments, calculates a quality determination criterion which is a numerical reference for each of the candidate chains, determines the importance of the candidate chains and relevance between them in the video signal structure pattern analysis, and outputs only candidate chains for which the quality determination criterion exceeds a predetermined quality determination criterion threshold.

32. The apparatus as set forth in claim 26, wherein the detecting means detects initial candidates for the cyclic chain, detects, from the initial candidates for the cyclic chain, temporally overlapping chains, and determines the consistency between the overlapping chains.

33. The apparatus as set forth in claim 21, wherein using the similarity chains, the analyzing means detects and outputs scenes each being a subset based on the semantics of visual and/or audio segments as a local structure of the video signal.

34. The apparatus as set forth in claim 21, wherein using the similarity chains, the analyzing means detects and outputs, as a global structure of the signal, a structure pattern in which visual and/or audio segments similar to each other appear repeatedly.

35. The apparatus as set forth in claim 34, wherein the analyzing means detects and outputs a news item in a newscast is detected and output as the structure pattern.

36. The apparatus as set forth in claim 34, wherein a video structure of a sportscast in which a play appears repeatedly is detected and output as the structure pattern.

37. The apparatus as set forth in claim 21, wherein using the similarity chains, the analyzing means detects and outputs a topic structure composed of ones relevant to each other, of the scenes each being a subset based on the semantics of the visual and/or audio segments.

\* \* \* \* \*